United States Patent
Anagnostopoulos

(10) Patent No.: US 10,610,919 B2
(45) Date of Patent: Apr. 7, 2020

(54) HIGH-SPEED MESH PRODUCING MACHINES AND PROCESSES WITH MESH DISTORTION NEGATION AND OCCUPIED SPACE REDUCTION

(71) Applicant: Antonios Anagnostopoulos, Athens (GR)

(72) Inventor: Antonios Anagnostopoulos, Athens (GR)

( * ) Notice: Subject to any disclaimer, the term of this patent is extended or adjusted under 35 U.S.C. 154(b) by 329 days.

(21) Appl. No.: 15/742,797

(22) PCT Filed: Jul. 7, 2016

(86) PCT No.: PCT/GR2016/000031
§ 371 (c)(1),
(2) Date: Jan. 8, 2018

(87) PCT Pub. No.: WO2018/007836
PCT Pub. Date: Jan. 11, 2018

(65) Prior Publication Data
US 2018/0369898 A1    Dec. 27, 2018

(51) Int. Cl.
*B21F 23/00* (2006.01)
*B21F 27/10* (2006.01)
(Continued)

(52) U.S. Cl.
CPC ............ *B21F 23/005* (2013.01); *B21F 1/026* (2013.01); *B21F 23/002* (2013.01); *B21F 27/10* (2013.01); *B23K 11/008* (2013.01)

(58) Field of Classification Search
CPC .......... B21F 15/02; B21F 15/06; B21F 15/08; B21F 27/005; B21F 27/08; B21F 27/10;
(Continued)

(56) References Cited

U.S. PATENT DOCUMENTS 7,100,642 B2 * 9/2006 Taboga ................... B21F 27/10
                                                              140/112
10,421,146 B2 * 9/2019 Anagnostopoulos ...................
                                                              B23K 11/008
(Continued)

FOREIGN PATENT DOCUMENTS

DE    21 42 321      3/1973
DE    34 22 661     12/1985
(Continued)

OTHER PUBLICATIONS

PCT/GR2016/000031, International Search Report and Written Opinion dated Jan. 8, 2019, 13 pages—English.
(Continued)

*Primary Examiner* — Pradeep C Battula
(74) *Attorney, Agent, or Firm* — Andrew F. Young, Esq.; Lackenbach Siegel, LLP

(57) ABSTRACT

The present invention relates to machines, systems and processes for feeding longitudinal wires (2) for mesh (6) production. Welding of longitudinal wires (2) with transverse wires (4) at welding unit (57) produces mesh (6). Longitudinal wires (2) are controllably rotated around their longitudinal axes to selected angles, and restrained until their welding with transverse wires (4), thus negating effects of residual curvature from roller straightener (36) and resulting in mesh (6) produced planar with distortion stresses effectively neutralized. A wire collector (79) releases a first longitudinal wire (2) for guided travel laterally to a receptacle (45). A rotator unit (71) simultaneously controllably rotates this wire, while the collector (79) simultaneously receives the length of the next longitudinal wire. Particular rotator units (71) facilitate such operation. In some versions an advancement roller assembly (120) proximate to the welding unit (57) may advance longitudinal wires (2) through the welding unit, freeing a longitudinal wires carrier (Continued)

(31) to return to the longitudinal storage (32) and to receive a next set of longitudinal wires.

20 Claims, 18 Drawing Sheets

(51) Int. Cl.
*B23K 11/00* (2006.01)
*B21F 1/02* (2006.01)

(58) Field of Classification Search
CPC ...... B21F 23/00; B21F 23/005; B21F 23/007; B21F 1/026; B23K 1/008; B23K 11/008
See application file for complete search history.

(56) References Cited

U.S. PATENT DOCUMENTS

| | | | |
|---|---|---|---|
| 2006/0038165 A1* | 2/2006 | Larsen | B21F 27/10 256/32 |
| 2012/0103460 A1* | 5/2012 | Anagnostopoulos | B21F 27/10 140/112 |

FOREIGN PATENT DOCUMENTS

| | | |
|---|---|---|
| WO | WO 95/05906 | 1/1995 |
| WO | WO 2011/010256 | 1/2011 |
| WO | WO2015/151029 | 10/2015 |

OTHER PUBLICATIONS

PCT/GR2016/000031, International Search Report and Written Opinion dated May 22, 2017, 20 pages—English.

* cited by examiner

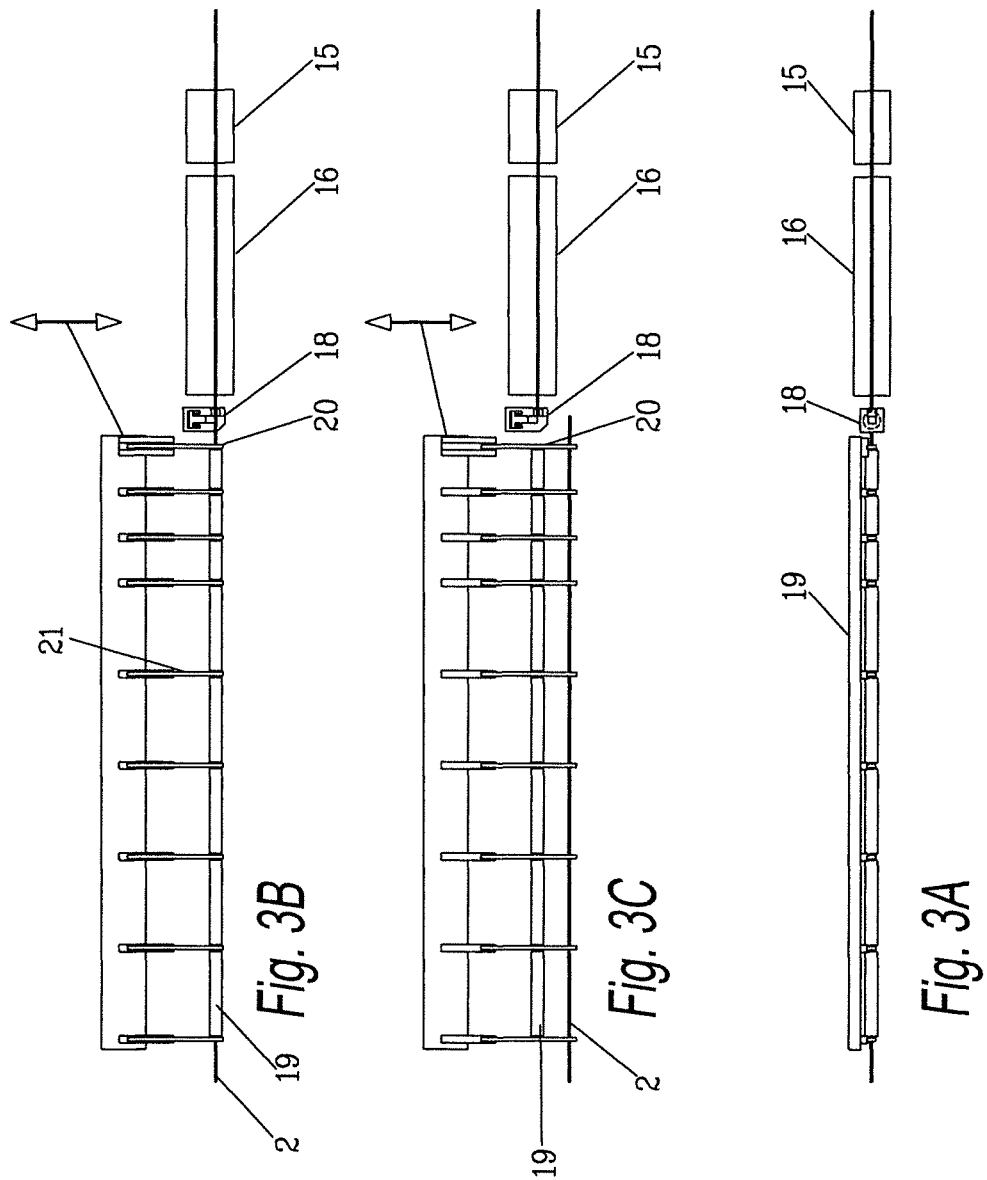

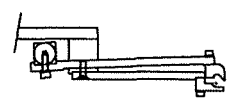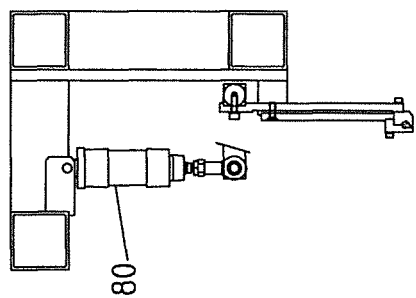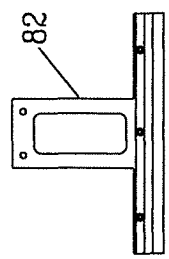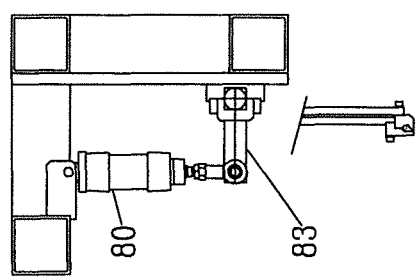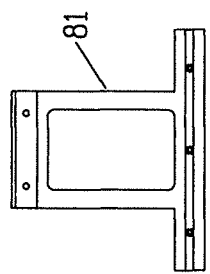
Fig. 9C
Fig. 9E
Fig. 9B
Fig. 9D
Fig. 9A

HIGH-SPEED MESH PRODUCING MACHINES AND PROCESSES WITH MESH DISTORTION NEGATION AND OCCUPIED SPACE REDUCTION

CROSS REFERENCE TO RELATED APPLICATION

This application relates to and claims priority from, PCT/GR2016/000031 filed Jul. 7, 2016, the entire contents of which are incorporated herein fully by reference.

TECHNICAL FIELD

The present disclosure relates to machines, systems and processes for feeding wires and rods for mesh production. The wires or rods are typically produced by pulling the wire or rod material from spools, straightening the material with rollers, and advancing the material with rollers, as well as cutting the material to length. After their production, the wires or rods are transferred to a welding unit while being restrained against freedom of rotation on their respective axes. Employing a straightener with rollers may permit high speeds, but on the other hand achieves relatively poor straightness because this type of straightening typically results in bow-effect (deflection) of the produced wires and rods, whereby the wires and rods having passed through straightening typically exhibit a residual curvature in one plane. According to the present disclosure, the longitudinal wires and rods may be controllably rotated around their respective longitudinal axes, so that their respective curvatures resulting from the straightener are also respectively rotated. This controlled, selective rotation takes place after an individual longitudinal wire is gripped and cut, and during an interval when this longitudinal wire is gripped by a rotator unit, prior to its handover to a receptacle of the longitudinals storage. The respective curvatures of the longitudinal members thus take specified directions, so that they effectively negate one another within the totality of the wires or rods when welded as a mesh. The result is a relatively planar mesh, yet produced with higher feeding speed of longitudinal wires.

BACKGROUND ART

Meshes have typically been produced from longitudinal wires and transverse wires welded at specified distances relative to each other. In conventional mesh welding machines, the longitudinal wire and the transverse wires typically come from wires wound in coils. Each longitudinal wire originated from a corresponding spool. The longitudinal wires are pulled from respective reels, and then pass through straighteners, as well as feeding mechanisms and intermediate storages. Transverse wire typically feeds from a spool via feeding rollers, and through a roller straightener. Conventional machines of this type may have significant productivity, but stand somewhat inflexible as to changing the product, such as changing of the spool and the wire diameter. Changing of wire diameters creates significant delays. Furthermore, such machines need a relatively large area because of the large number of reels and spools for the longitudinal wires that are handled. Prior U.S. Pat. No. 7,100,642B2 provides an example. Applicant's own previous published application WO 2011/010256A1, particularly at FIG. 6 thereof, provides an exemplary illustration of prior art practices in this regard.

In another category of machines, the longitudinal wires are produced by other straightening machines and then transported to the mesh welding machine. These longitudinal wires are straightened and precut to required dimensions. Their placement in the welding machine is made manually. Previous published application WO2011/010256A1, particularly at FIGS. 7A-7B thereof, provided an exemplary teaching of prior art practices in this regard. Such machines are characterized by relatively smaller size, higher flexibility to production changes, and relatively lower output productivity. Automated feeding of the longitudinal wires may be made, from a storage where these longitudinals are stored. Prior DE-4423737 A1 provides an indicative example in this regard. However, this type of machine is relatively complex, presents malfunctions, and stands relatively inflexible in the procedure of changing diameters or lengths of the longitudinals, because such changing presumes first an emptying of the storage, and then a filling of it with the new wires.

In yet another category of welding machines, the longitudinal wires come from a spool on a reel. They are straightened and cut at suitable lengths for the desired mesh. Subsequently, they are automatically transported towards the mesh welding machine. Because the longitudinal wires have a large length, for example mesh of width 2 m and length 6-12 m being common, straightening of the longitudinal wires is made with rotor straighteners and not with two-plane roller straighteners, so that the wires may be relatively perfectly straightened. These longitudinal wires are then transported from their production location towards welding heads. The straightener with rotor produces relatively perfect straightening quality, but the straightened wire proceeds at relatively low speed. Consequently, while these machines exhibit operational flexibility in regards to changing wire diameters and lengths, nevertheless, they achieve very low productivity primarily because of the low speed of the rotor straightening.

Applicant's own previous published application WO 2015/151029A1 included solutions by which high flexibility in changing of the spool and the wire diameter may be attained with simultaneous elimination of need for large area required by large number of reels and spools for the longitudinal wires. This previous published application WO2015/151029A1 proceeded yet further, far beyond Applicant's own prior published application WO 2011/010256A1, so as to set forth new solutions permitting the employment of higher speed roller straighteners, while effectively overcoming potential undesirable results in the produced mesh. Productivity and output quality increased, and the need for slower, rotor straighteners providing relatively perfect straightening quality was eliminated. Applicant's own previous published application WO 2015/151029A1 may reasonably be understood as the closest relevant publication.

SUMMARY OF INVENTION

Technical Problems

In this context, there was a continuing need to provide options for increasing speed of production and delivery of longitudinal wires to the welder, where they are welded to transverse wire. A first potential opportunity to improve efficiency appeared at the interval of time occupied by a linear feeding, through the cutter, of the length an individual longitudinal wire under production directly into a receptacle of the longitudinals carrier, followed in series by a restraining of the wire against freedom to rotate, then its cutting, and, then in series, its controlled rotation (when effected) to a selected angle, and a restraining of it within a receptacle or sheath of the longitudinals storage. These serially-executed steps provided a fundamental limitation on the speed with which filling and step-wise advancements of the longitudinals storage could be effected in order to advance the deposited and restrained longitudinal wires to the welding path for transfer by a carrier to the welder.

Further within this context, there was a continuing need to provide optimally functioning and cost-effective longitudinals receptacles on the longitudinals storage.

Also within this context, another potential opportunity for time efficiency appeared at the interval of time during which a first carrier of longitudinal wires to the welder is required to remain in the proximity of the welder while welding of transverse wires occurs, rather than returning to a position ready for receipt of a new set of longitudinal wires from the longitudinals storage, for the next mesh.

Concurrently, there developed a contextually interrelated need to provide new and enhanced rotator units that could reliably, simply, and more efficiently overcome the challenges present to increasing productivity of mesh welding machines, mesh wire production systems, and processes of mesh welding.

There was a parallel, continuing need to seek possible reduction in the amount of production floor space occupied by mesh welding machines and processes of mesh welding, by possibly eliminating, replacing, or shortening certain components and/or paths of the machines and processes.

As shall become apparent to readers having ordinary skill in the relevant technology fields, these and other problems are addressed by at least some of the versions and variants of solutions presented within the scope of the present disclosure.

Solutions to the Problems

Thus, it may be understood as within the scope of the present disclosure to set forth: Mesh production machines including wire straightener for wire, cutter configured to receive wire straightened by the wire straightener, a longitudinals storage configured to receive longitudinal wires cut by the cutter, this longitudinals storage having a plurality of longitudinals receptacles configured to restrain longitudinal wires; as well as a rotator unit configured to controllably rotate cut longitudinal wires around their longitudinal axes to specified angles, this rotator unit having a gripper assembly and being located at an intermediate location between a location of the cutter and a location of transverse wire welding; and a longitudinals carrier configured to transfer longitudinal wires from the longitudinals storage towards a welding unit, this longitudinals carrier having means for restraining against rotation wires held by it; as well as a wire collector positioned to receive wire in spaced relation to the longitudinals receptacles, this wire collector being controllably openable for wire removal over its longitudinal extent; wherein the gripper assembly is movably mounted for controlled translatory motion on a path of movement extending at least between (a) a first position aligned with the wire collector in spaced relation to said longitudinals receptacles, and (b) a handover position situated for the delivery of wire towards a proximate respective longitudinals receptacle of the longitudinals storage; as well as means for holding wire released by the wire collector, this means for holding wire being situated to guide held wire during controlled translatory motion of the gripper assembly between the first position and the handover position; and a first motor operatively connected to the rotator unit to controllably move the gripper assembly on the path of movement extending at least between the first position and the handover position; wherein operatively connected to the gripper assembly are means for controllably driving the gripper assembly in controllably rotating gripped longitudinal wires around their longitudinal axes to specified angles; and, each of the longitudinals receptacles has respective means for restraining against rotation longitudinal wire delivered to it.

Optionally in mesh production machines according to the previous paragraph, the longitudinal receptacles' respective means for restraining against rotation may each include at least one respective magnet, and/or at least one respective spring sheath, and/or at least one respective clamping digit. It is also optional to provide means for pressing wire out of the means for holding wire and onto a proximate respective receptacle of the plurality of longitudinals receptacles. In possible combination with any of these options according to the present or preceding paragraphs, it is also an option to provide an advancement roller assembly situated proximate to an entry of the welding unit, this advancement roller assembly being controllably engageable to controllably advance longitudinal wires through the welding unit. In possible combination with any of the options according to the present or preceding paragraphs, it may be particularly advantageous to include a mesh carrier situated after an exit of the welding unit, this mesh carrier being configured to controllably pull longitudinal wires through the welding unit.

In versions of mesh production machines according to the two preceding paragraphs, it may be a particularly advantageous option to provide rotator units that include a first gripper arm, and a first gripper surface disposed on this gripper arm, this rotator unit also including a second gripper arm opposite to and spaced from the first gripper arm, and a second gripper surface being disposed on this second gripper arm; with a first gripper arm drive rack being connected to the first gripper arm, and a second gripper arm drive rack connected to the second gripper arm; as well as a pinion gear disposed between the first and second gripper arm drive racks and engaging for simultaneous opposite reciprocations both of these first and second gripper arm drive racks so as to reciprocate the first gripper arm and the first gripper surface in opposite direction relative to reciprocation of the second gripper arm and the second gripper surface; further also at least one spring situated to bias the first gripper arm and the first gripper surface away from the second gripper arm and the second gripper surface; as well as a grip motor operatively connected to controllably push the first gripper arm towards the second gripper arm, in opposition to the at least one spring.

It should also be understood as within the scope of the present disclosure to set forth: Mesh wire production systems including a longitudinals storage, this longitudinals storage including a plurality of longitudinals receptacles thereon; also a controllably-openable wire collector located in spaced relation to the longitudinals storage and its plurality of longitudinals receptacles; also a movably-mounted wire gripper assembly; further, a first motor operatively connected to controllably translate the wire gripper assembly in controlled translatory motion along a travel path that extends at least between a first position aligning the wire gripper assembly with the controllably-openable wire collector, and a handover position that locates wire gripped by the wire gripper assembly proximate to one of the plurality of longitudinals receptacles; as well as a wire holder assembly situated to guide wire during controlled translatory motion of the gripper assembly between the first position and the handover position; and, a second motor operatively connected to controllably drive the wire gripper assembly to axially rotate gripped longitudinal wire.

Optionally in mesh wire production systems according to the preceding paragraph, the wire holder assembly may include a plurality of pincers configured to grasp a wire located within the controllably-openable wire collector, this plurality of pincers being movably mounted for controlled movement between at least the first and the handover positions. Further to this option, as a further option, the first motor may be operatively connected to controllably move this plurality of pincers synchronously with the wire gripper assembly from the first position towards the handover position. Beyond this further option, it is also an option to have in each of the plurality of pincers and also the wire gripper assembly, all respectively, respective wire passages therethrough accommodating reloading of the controllably-openable wire collector. In any version according to the present paragraph, optionally at least one of the plurality of pincers may be spring-biased to close upon wire held therein. Also in any version according to the present paragraph, optionally there may be provided an extractor unit configured to controllably push wire at the handover position from the plurality of pincers to a proximate one of the plurality of longitudinals receptacles; more specifically in this regard it is yet a further option that the extractor unit includes a plurality of controllably driven press shoes aligned to controllably push a wire from the plurality of pincers.

Optionally, in any version according to the preceding two paragraphs, it may be particularly advantageous to include a first side plate in the controllably-openable wire collector, and a second side plate in the controllably-openable wire collector. More specifically as to this latter option, it may be particularly advantageous as a further option to provide a first plurality of side plate segments forming the first side plate, a second plurality of side plate segments forming the second side plate; and to provide the wire holder assembly with at least one pincer configured to grasp wire between two respective side plate segments of this first plurality of side segments. In versions including such side plates, it may be advantageous as an option to provide a wire-collector motor operatively connected to controllably impart a relative motion between the first and second side plates of the controllably-openable wire collector.

At this point, it should also be understood as within the scope of the present disclosure to also set forth new versions of wire rotator units that are independently viewable as interrelated machines that work together with versions of mesh production machines and/or versions of mesh wire production systems, and within processes for mesh production. Versions of wire rotator units within the scope of the present disclosure may include a first gripper arm, and a first gripper surface disposed on the first gripper arm, as well as a second gripper arm opposite to and spaced from the first gripper arm, and a second gripper surface disposed on the second gripper arm; with a first gripper arm drive rack being connected to the first gripper arm, and a second gripper arm drive rack connected to the second gripper arm; as well as a pinion gear disposed between the first and second gripper arm drive racks and engaging for simultaneous opposite reciprocations both of these first and second gripper arm drive racks so as to reciprocate the first gripper arm and the first gripper surface in opposite direction relative to reciprocation of the second gripper arm and the second gripper surface; further also at least one spring situated to bias the first gripper arm and the first gripper surface away from the second gripper arm and the second gripper surface; as well as a grip motor operatively connected to controllably push the first gripper arm towards the second gripper arm, in opposition to the at least one spring.

Optionally, in wire rotator units according to the preceding paragraph, there may advantageously be a first carriage for the first gripper arm, with the first gripper arm being mounted to reciprocate on this carriage, and a second carriage for the second gripper arm, the second gripper arm being mounted to reciprocate on the second carriage; with the first carriage being pivotable, around a drive shaft of the pinion gear, relative to the second carriage. Further according to this option, the grip motor may be operatively connected to pivot the first carriage and the first gripper arm towards the second carriage and the second gripper arm, around the drive shaft of the pinion gear, in opposition to the at least one spring. As a further option to any version of the present paragraph, there may be a reciprocating elevator carriage operatively connected to simultaneously carry in reciprocation the drive shaft of the pinion gear, and also the first carriage and second carriage. Furthermore, as a further option to any version of the present or preceding paragraphs, there may be a wire passage configured to pass wire between the first gripper arm and the second gripper arm, this wire passage being at a location between the pinion gear and respective inner ends of both of the respective first and second gripper surfaces.

It should also be understood as within the scope of the present disclosure to set forth: Processes for mesh production including steps of, pulling wire from at least one coil; straightening the pulled wire; restraining by gripping the wire; cutting the straightened pulled wire to produce gripped longitudinal wires; controllably rotating respective gripped longitudinal wires around their respective longitudinal axes to specified angles; depositing the rotated longitudinal wires at a longitudinals storage that has a plurality of longitudinals receptacles; transferring the longitudinal wires from the longitudinals storage to a longitudinals carrier; moving the longitudinals carrier to advance the longitudinal wires towards a welding unit; welding the wires into mesh with transverse wires; restraining the longitudinal wires at least until their welding with a first to transverse wire in the mesh; producing longitudinal wires in a wire collector positioned in spaced relation to the longitudinals storage; controllably opening the wire collector to laterally remove a produced longitudinal wire along its length; carrying the longitudinal wire on a travel path towards the longitudinals storage and in traversal of the spacing between the wire collector and the longitudinals storage; gripping, with a gripper assembly movable in a direction of the travel path towards the longitudinals storage, the carried longitudinal wire at least between, (a) a first position aligned with the wire collector in spaced relation to the longitudinals storage, and (b) a handover position situated for delivery of wire towards a proximate longitudinals receptacle on the longitudinals storage; and, controllably rotating, with the gripper assembly, the longitudinal wire around its longitudinal axis to a specified angle.

Optionally, in processes for mesh production according to the preceding paragraph, there may be included the particularly advantageous step of refilling the wire collector with straightened pulled wire during the step of carrying the longitudinal wire on a travel path towards the longitudinals storage. As a further option to any version of processes according to the present or preceding paragraphs, there may be a step of restraining longitudinal wire at a longitudinals receptacle on the longitudinals storage using at least one magnet, and/or at least one spring sheath, and/or at least one clamping digit. Also as a further option to any version of processes according to the present or preceding paragraphs, the step of carrying the longitudinal wire on a travel path towards the longitudinals storage may be effected by controllably moving holders concurrently to the gripper assembly movement between the first position and the handover position. In versions according to this latter option, there is yet a further option to include steps of: mechanically extracting longitudinal wire delivered from the handover position, out of the holders and onto a proximate longitudinals receptacle on the longitudinals storage; and releasing the gripper assembly. As yet a further option to any version of processes. according to the present or preceding paragraphs, there may be a step of controllably advancing longitudinal wires through the welding unit with a controllably engageable advancement roller assembly situated proximate to an entry of the welding unit. Finally, a further option to any version of processes according to the present or preceding paragraphs may include the step of controllably pulling longitudinal wires through the welding unit with a mesh carrier situated after an exit of the welding unit.

It should also be understood as within the scope of the present disclosure to set forth: Processes for mesh wire production comprising the steps of, filling a wire collector positioned in spaced relation to a longitudinals storage, gripping wire in the wire collector with a gripper assembly, controllably opening the wire collector to remove the wire therein laterally along its length, carrying the removed wire laterally to its axis on a travel path towards the longitudinals storage and in traversal of the spacing between the wire collector and the longitudinals storage, and simultaneously, during said step of carrying the removed wire, controllably rotating with the gripper assembly the wire around its longitudinal axis to a specified angle.

Optionally, in processes for mesh production according to the preceding paragraph, there may be included the particularly advantageous step of simultaneously refilling the wire collector during the step of carrying the removed wire. Also as a further option to any version of processes according to the present or preceding paragraph, there may be a further step of carrying the removed wire laterally to its axis on the travel path towards the longitudinals storage by controllably moving at least one holder synchronously with the gripper assembly. Further to this latter option, there may be a step of refilling the wire collector through respective wire passages in the gripper assembly and the at least one holder, respectively, during this latter step of carrying the removed wire laterally to its axis on the travel path towards the longitudinals storage by controllably moving at least one holder synchronously with the gripper assembly; and/or the additional steps of mechanically extracting wire onto the longitudinals storage from the at least one holder, and releasing the gripper assembly.

According to the invention, relevant solutions are achieved by machines, devices and systems having the features of independent claims 1, 14 and 19, and by processes having the features of independent claims 7 and 29.

Advantageous configurations and further developments of the invention are evident from the dependent claims and from the description in combination with the figures of the drawings.

At this point, it should be pointed out that, in the context of the present written disclosure, including claims, the term "wire" should equivalently be understood as meaning or indicating, in the context of the present disclosure, claims and appended drawings, either a wire or rod, or other suitable elongate material employed in mesh production; as in implementations of the invention the material employed, as well as the dimensions of the individual elements, may be commensurate with the requirements of particular applications.

Advantageous Effects of Invention

Machines, systems and processes according to the present disclosure may be understood to present many advantages, especially notably in attaining relatively high productivity by facilitating employing of rollers for the straightening and advancement of the longitudinal wires. Machines, systems and processes according to the present disclosure continue to exhibit exceptional flexibility as to changing the diameter of the longitudinal wires. Machines, systems and processes within the present disclosure may retain capabilities to sequentially produce meshes of different dimensions without significant effects to system productivity. Versions of machines, systems and processes within the present disclosure may provide rapid, enhanced filling and advancement of a longitudinals storage and its wire receptacles. Some versions of machines, systems and processes within the present disclosure may possibly reduce or eliminate the delay inherent in dwell time of a longitudinals carrier at an entrance to a welder for the transverse mesh wires. Some versions of machines, systems and processes within the present disclosure may possibly reduce the required space needed for the placement and operation of mesh welding machines, mesh wire production systems, as well as for the execution of processes of mesh welding. Some versions of machines, systems and processes within the present disclosure may possibly employ, as interrelated, simple, efficient, and reliable new rotator units. Furthermore, systems and processes according to the present disclosure may be fully automated and controlled via computer.

Processes within the present disclosure may produce and deliver the longitudinal wires of meshes with higher speed to produce mesh without significant deformation. They simultaneously maintain a flexibility and a relatively smaller spatial extent of the machine and system. Processes within the present disclosure may produce the longitudinal wires with relatively high speed, transport them to welding units, and place the longitudinal wires with individually specified directions and curvatures, so that there is net negation over the totality of wires to effectively neutralize mesh distortion stresses, and so that effectively planar mesh is produced.

These, and numerous other actual, possible or potential, advantageous effects shall become more apparent to persons ordinarily skilled in the relevant technologies when considering the totality of the present written disclosure and the appended drawings.

BRIEF DESCRIPTION OF THE DRAWINGS

Aspects of the systems and processes according to the present invention may be understood from the following description and from the appended drawings, where some exemplary and non-limiting versions of the machines, systems, and processes are presented, and where parts that are the same or similar or have equivalence, in the several drawings, are provided with the same reference numeral labels:

FIG. 3A—schematically depicts a wire collector and wire cutter from a top elevation;

FIG. 3B—schematically depicts a wire collector and wire cutter from the side with longitudinal wire at a first position;

FIG. 3C—schematically depicts a wire collector and wire cutter from the side with longitudinal wire at a handover position;.

FIG. 9A—side view of movable plate of wire collector;

FIG. 9B—side view of stationary plate of wire collector;

FIG. 9C—end view of exemplary wire collector in open position;

FIG. 9D—end view of wire collector motor and mechanical linkage for driving movable plate of wire collector, with cut view of collector;

FIG. 9E—end view of exemplary wire collector in closed position, with cut view of its motor and mechanical linkage;

DESCRIPTION

The description provided in following to the present paragraph sets forth a number of examples in a manner generally intended as non-limiting or indicative. In the present description, numerous specific details are set forth in order to provide a thorough understanding of some exemplary versions lying within the scope of the present invention. It shall be apparent, however, to persons skilled in the relevant technologies, that some versions of the present invention may be practiced without some of these specific details. Indeed, reference in this specification to "one version," "a/the version," "a/the variant," and "one variant," should be understood to mean that a particular feature, structure, step, or characteristic described in connection with the version, or variant is included in at least one such version of variant of the disclosure. Thus, the appearances of phrases "in one version," "in one variant," and the like in various places in the specification are not necessarily all referring to the same version or variant, nor are separate or alternative versions or variants necessarily mutually exclusive of other versions or variants. Moreover, various features are described which may be exhibited by some versions or variants, and not by others. Similarly, various requirements are described which may be requirements for some versions or variants, but not others. Furthermore, as used throughout this specification, the terms 'a', 'an', 'at least' do not necessarily denote a limitation or enumeration of quantity, but rather denote the presence of at least one of the referenced item in the sense that singular reference of an element does not necessarily exclude the plural reference of such elements. Concurrently, the term "a plurality" denotes the presence of more than one referenced items. Finally, the terms "connected" or "coupled" and related terms are used in an operational sense, and are not necessarily limited to a direct connection or coupling.

Figure 1A:
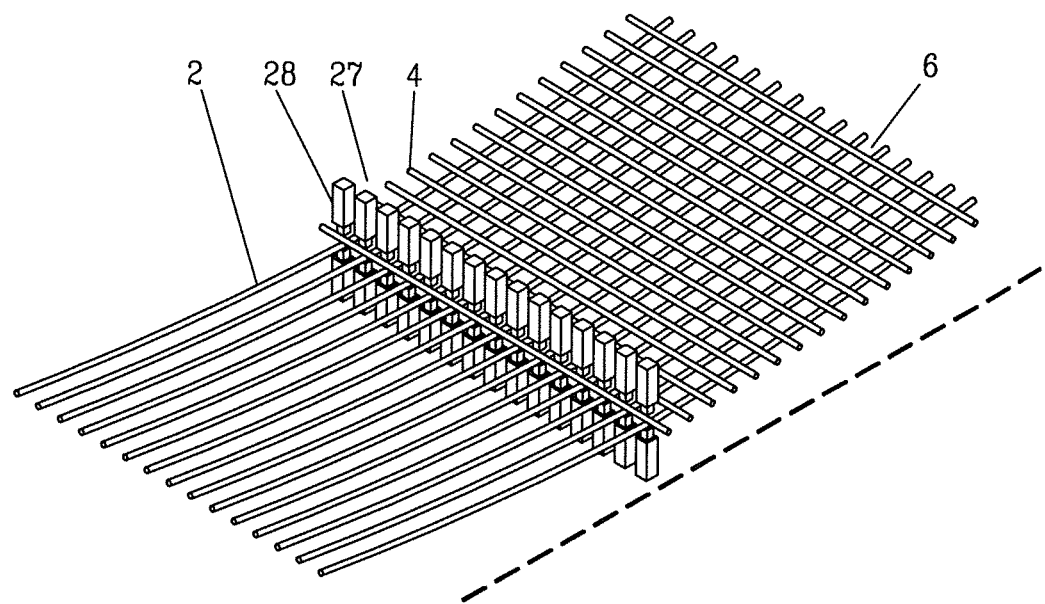
FIG. 1A—simplified depiction of the effect of curvature of the longitudinal wires upon the planarity of welded mesh.
Figure 1B:
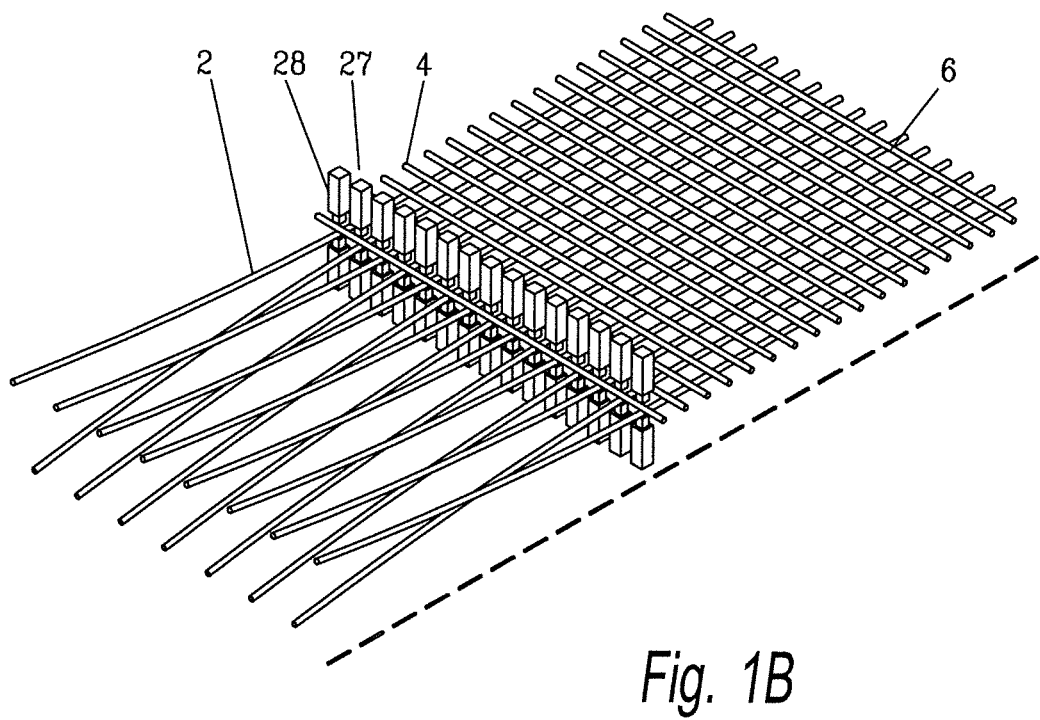
FIG. 1B—simplified depiction of longitudinal wires with curvature in mesh, longitudinal wires controllably rotated to specified angles.

The schematic depictions of FIGS. 1A-1B were previously presented in Applicant's prior published application WO2015/151029A1, but merit revisiting herein so as to enhance the comprehensibility of the present disclosure particularly for readers that may not be ordinarily skilled in the relevant technology fields. As shown in FIG. 1A, typically when longitudinal wires 2 are produced via roller straighteners, there is some residual curvature in each wire that may depend on many variable factors such as the spool and reel origin, the condition of intermediate handling devices, the properties of the wire, the characteristics and condition of the roller straightener, and possibly other factors. This residual curvature typically manifests itself in an uncontrolled manner in any particular production. In the idealized example of FIG. 1A the longitudinal wires 2 produced in close sequence to one another are depicted as retaining the same, or similar, residual curvature, given that, in practice, the manifestation of the effects of the above-mentioned variable factors typically remains similar or identical during a shorter production interval for a small group of sequentially produced wires, while possibly changing as production time passes. While FIG. 1A depicts the concavity in the upwards direction, readers should understand that the wire group's residual curvature may possibly originally lay in any direction of the 360 degrees about the wire axes. When welding heads 28 of welding unit 27 weld the transverse wires 4 onto the longitudinal wires 2, the resulting mesh 6 exhibits undesirable deformation, and deviation from planarity indicated by the dashed line of FIG. 1A.

Applicant's prior WO2015/151029A1 for the first time compensated the wire curvatures by permitting controllably rotating each of the mesh 6 longitudinal wires 2 to respective selected angles, then restraining the wires 2 at their respective angles at least until their welding with at least one transverse wire 4, so as to seek negation in the totality of wires 2 and thus the welded mesh 6, of any possible curvature they may have acquired or retain. In the general sense, Applicant's prior WO2015/151029A1 was understandable as permitting each longitudinal wire to be controllably rotated to a selected angle appropriate to that longitudinal wire, in order to achieve the negation in the mesh 6. FIG. 1B depicts a simplified example of a negation, from which it may immediately be understood that rotating the longitudinal wires 2 sequentially, so that their curvatures lie directly opposite at 180 degrees from their neighboring wires, produces the indicated mesh 4 planar with distortion stresses effectively neutralized. FIG. 1B should be understood as exemplary and for the purposes of simplified illustration, since, in practice, the longitudinal wires' residual curvatures may not necessarily reside only strictly perpendicular to a plane of the mesh 6. Furthermore, addressing the effects of residual curvatures may be more complicated when plural spools, such as for example with different wire sizes/gauge or with different materials, are desired to be employed to supply longitudinal wires 2, or transverse wires 4, for the mesh 6.

Figure 2:
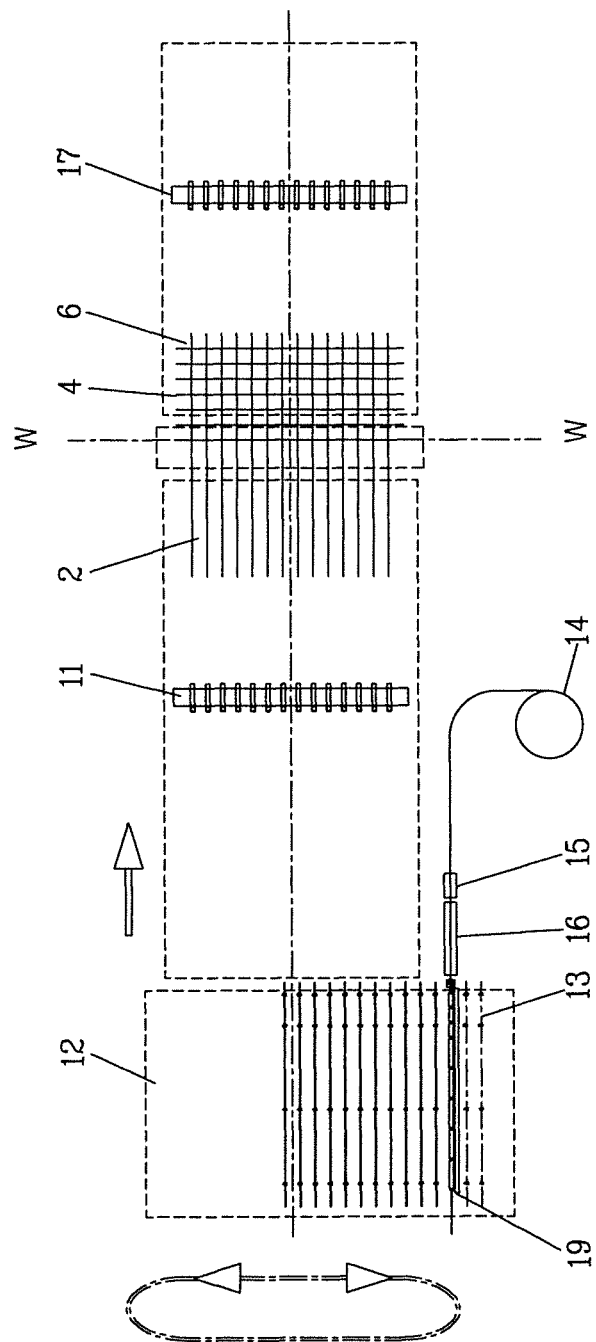
FIG. 2—schematically depicts an overview of operational principles of exemplary machines, systems, and processes.

FIG. 2 presents a schematic illustration providing an overview of operational principles of some exemplary machines, systems, and processes within the scope of the present disclosure. Longitudinal wires 2 are advanced towards a welding line W where transverse wires 4 are welded thereon to produce mesh 6. As schematically depicted by the indicating arrow, the longitudinals carrier 11 moves to advance longitudinal wires 2 from longitudinals storage 12 to the welding line W, simultaneously restraining them against rotation about their respective axes. As may be understood, the longitudinal wires 2 are restrained at least until a first transverse wire 4 is welded to them in the mesh. A post-welding mesh carrier 17 situated after an exit from welding may be employed to pull or push the welded mesh 6 away from welding line W, and possibly to pull the unwelded remainders of the longitudinal wires 2 through the welding line W. The longitudinals storage 12 has a plurality of longitudinals receptacles 13 that restrain longitudinal wires 2 against rotation about their respective axes. The supply of longitudinal wire material may be made from a wire coil 14. The wire uncoils to an advancement mechanism 15, schematically depicted, which may be of a known type with rollers, and is fed through a roller straightener 16, schematically depicted, which may be of a known type, and then through a cutter 18 schematically depicted in FIG. 3A.

FIG. 3A schematically indicates a wire collector 19 from a top elevation, as in FIG. 2, where it is depicted in spaced relation to the longitudinals storage 12. FIGS. 3B-3C further explain the spaced relation of the wire collector relative to the longitudinals storage 12. In FIG. 3B, a longitudinal wire 2 is produced in the wire collector 19 in spaced relation with spacing relative to the longitudinals storage 12 which may possibly be under the wire collector as depicted in this example. The wire is gripped with a gripper assembly 20 as depicted in FIG. 3B at a first position aligned with the wire collector 19, and this restrains the wire by gripping. It is then cut by cutter 18 to complete its production as an individual longitudinal wire 2. The gripper assembly 20 controllably rotates the gripped longitudinal wire 2 around its respective longitudinal axis to a specified angle, and there are means for controllably driving the gripper assembly 20 operatively connected to it for this purpose, such as known motor(s) or mechanical links or transmissions. This gripper assembly 20 also moves to carry the longitudinal wire 2 on a travel path towards the longitudinals storage 12 in traversal of the spacing between the wire collector 19 and the longitudinals storage 12. This transfer may occur when the wire collector 19 is controllably opened to allow lateral removal of a produced longitudinal wire 2 along its length as depicted in FIG. 3C. Elements 21 carry in guided manner the longitudinal wire 2 on the travel path towards the longitudinals storage 12. These elements 21 may be means for holding wire released by the wire collector 19, such as holders, as a non-limiting example, either actively motor-driven, or passive. Gripping with the gripper assembly 20 is effected at least between a first position, as in FIG. 3B, aligned with the wire collector 19 in spaced relation to the longitudinals storage 12; and a handover position such as in FIG. 3C that is situated for delivery of wire towards a proximate longitudinals receptacle 13 on the longitudinals storage 12.

Considering FIGS. 3A-3C, it should be immediately understandable that it may be advantageous to refill the wire collector 19 simultaneously, while the produced longitudinal wire 2 is, per FIG. 3B, in controlled translatory motion on the travel path towards the longitudinals storage 12. Furthermore, it should be immediately understandable that it may be advantageous to controllably rotate the gripped longitudinal wire 2 around its respective longitudinal axis to a specified angle with the gripper assembly 20 simultaneously to carrying the longitudinal wire 2 on the travel path towards the longitudinals storage 12 in traversal of the spacing between the wire collector 19 and the longitudinals storage 12. That is, while the produced longitudinal wire 2 is, per FIG. 3B, in controlled translatory motion on the travel path towards the longitudinals storage 12. It may be understood that these are not mandatory to the operation, but, when effected, may result in significant saving of time and thus an increase in speed.

Figure 4A:
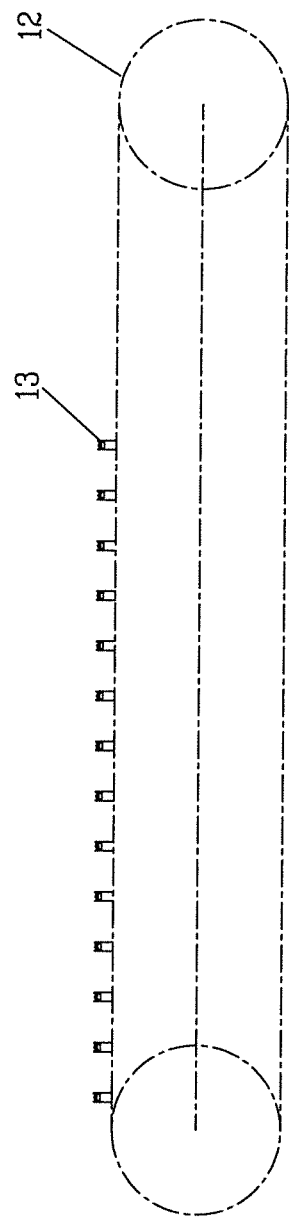
FIG. 4A—schematically depicts an exemplary longitudinals carrier, from end, with longitudinals receivers.
Figure 4B:
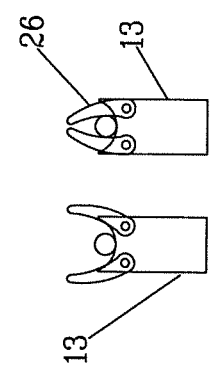
FIG. 4B—schematically depicts an exemplary longitudinals receiver with magnet restrainer.
Figure 4C:
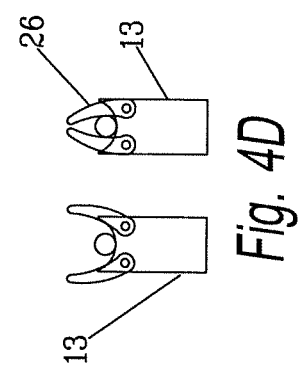
FIG. 4C—schematically depicts an exemplary longitudinals receiver with spring sheath restrainer.
Figure 4D:
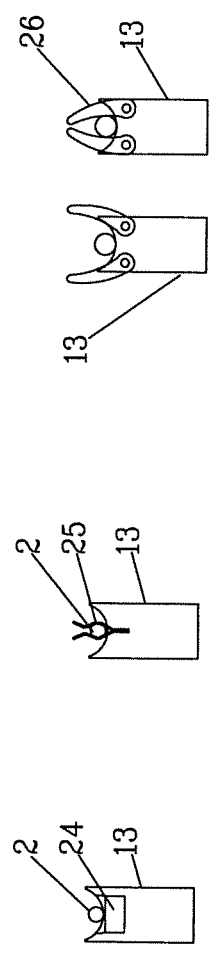
FIG. 4D—schematically depicts an exemplary longitudinals receiver with clamping digits.

Considering FIGS. 4A-4D, an exemplary longitudinals carrier 12 is depicted with longitudinals receptacles 13 conveyable upon it for the purposes of receiving the longitudinals wires 2 delivered at the handover position, and of transferring the restrained longitudinal wires 2 towards the longitudinals carrier 11. As schematically depicted in FIG. 4A, each of the longitudinals receptacles 13 has means for restraining against rotation longitudinal wire 2 delivered to it. Considering FIG. 4B, the means for restraining against rotation may include at least one magnet 24. Considering FIG. 4C, the means for restraining against rotation may include at least one spring sheath 25. Considering FIG. 4D, the means for restraining against rotation may include at least one clamping digit 26, or more preferably a pair of clamping digits 26, as depicted.

Figure 5:
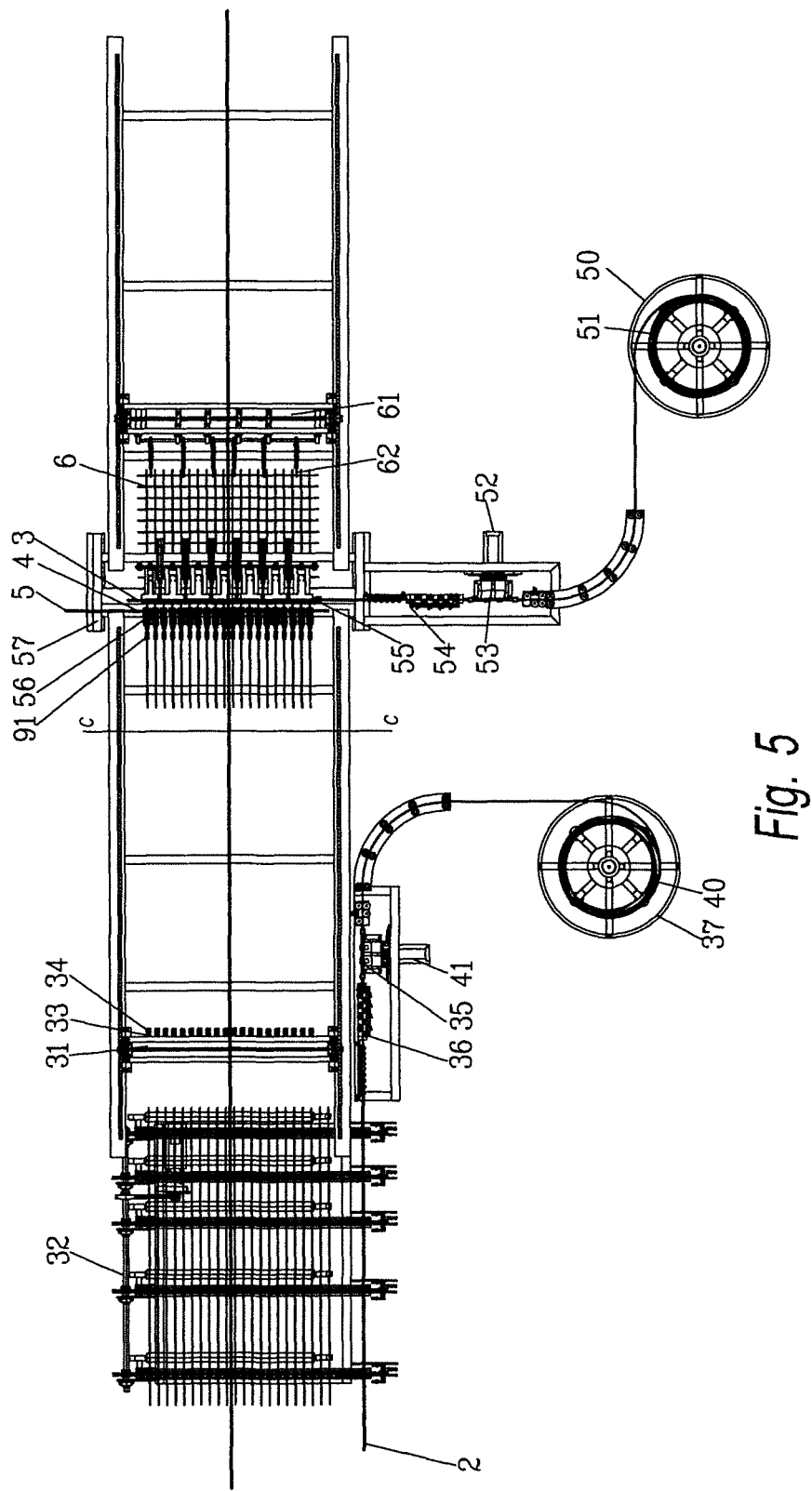
FIG. 5—a top view of a version of exemplary welding machine without wire collector, rotator unit, or associated structures and elements.
Figure 6:
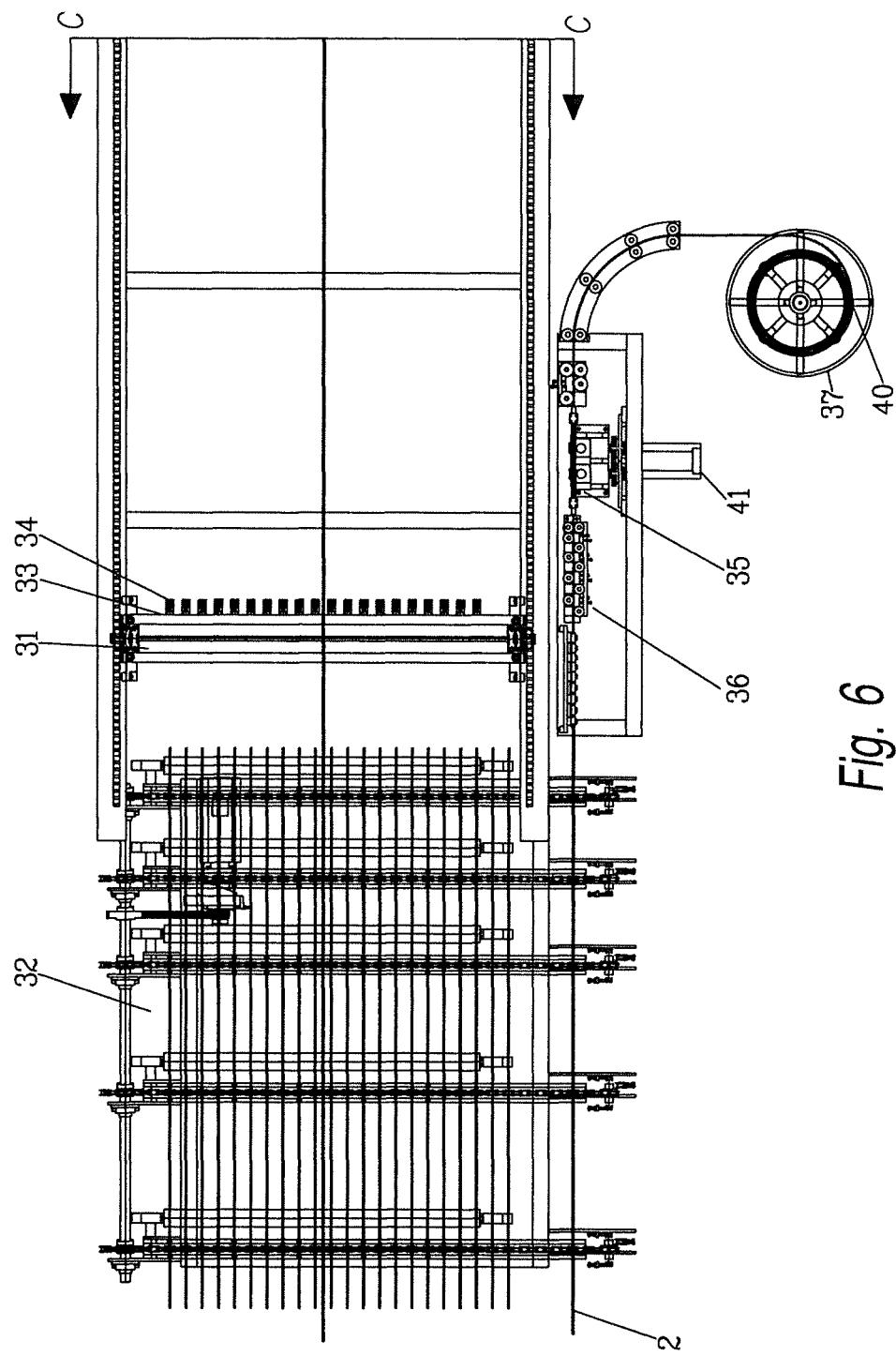
FIG. 6—a magnified top view of the version of FIG. 5, taken on the left side of line C-C without wire collector, rotator unit, or associated structures and elements.

Turning to FIG. 5, and its magnified-view left of section C-C depicted in FIG. 6, an exemplary welding machine within the scope of the present disclosure may have a spool 37 upon which wire is coiled and from which it is supplied via a reel 40, to pass to advancement rollers 35 typically driven by a motor 41. A roller straightener 36 straightens the wire. Details of the wire collector, grippers, and other operationally related features are entirely omitted for simplicity. This exemplary longitudinals storage 32 includes a plurality of motor-driven chains which shall be discussed in greater detail in reference to subsequent figures of the drawings. An exemplary longitudinals carrier 31 has guides 33 and restrainers in the way of grippers 34 so that longitudinal wires 2 transferred from the longitudinals storage 32 may be restrained against rotation when the longitudinals carrier 31 is moved to advance the longitudinal wires towards a welding unit 57 having welding heads 56.

Figure 7:
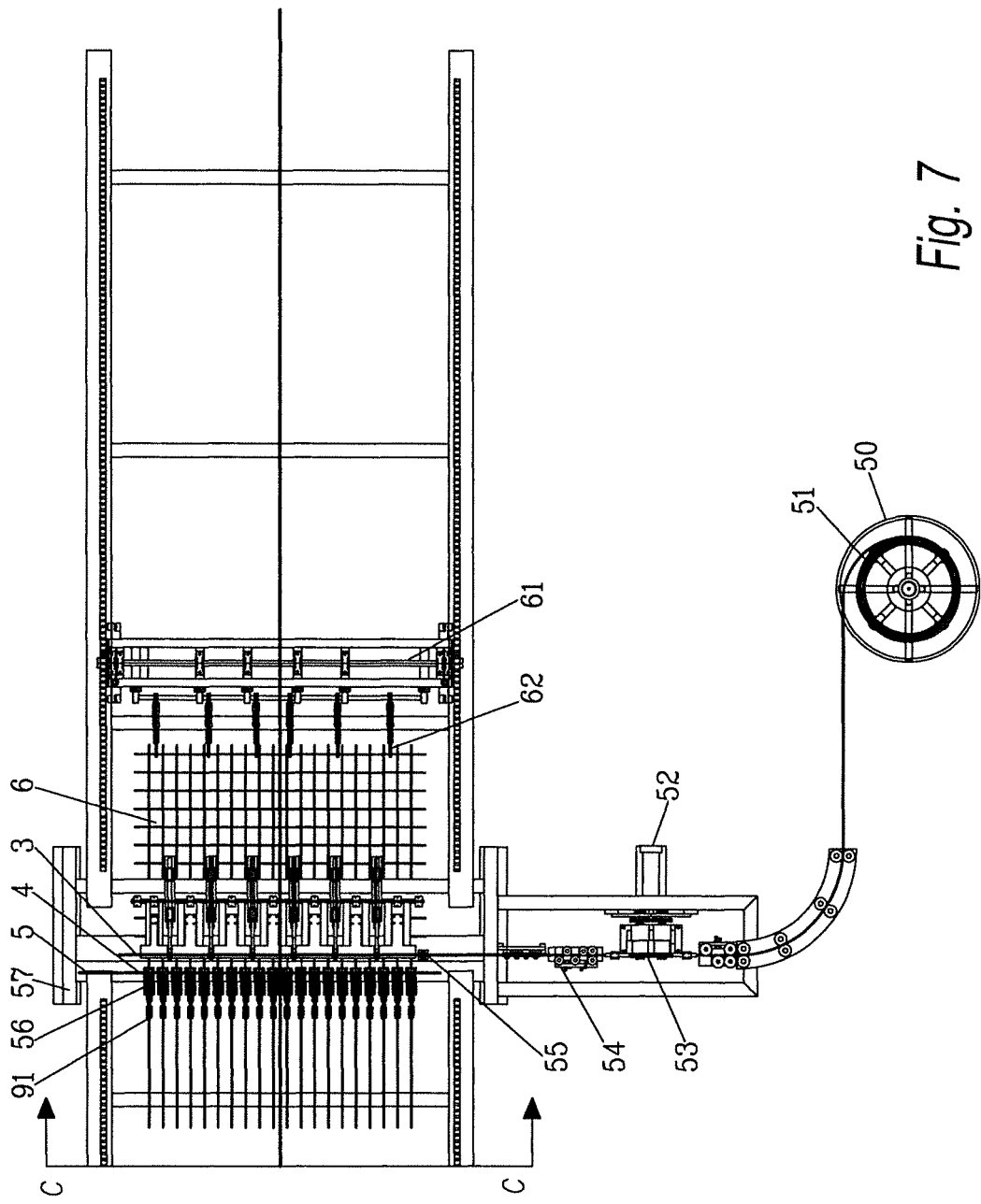
FIG. 7—a magnified top view of the version of FIG. 5, taken on the right side of line C-C.

Remaining with FIG. 5, and its magnified-view to the right of section C-C depicted in FIG. 7, the transverse wire material is coiled on spool 51 and from which it is supplied via a reel 50, to pass to advancement rollers 53 typically driven by a motor 52. A roller straightener 54 straightens the wire. It is cut with a cutter 55 on axis 3 of transverse wire advancement, so to be produced as an individual transverse wire 4 that is welded on the welding axis 5 by welding heads 56 of welder 57. There may be grippers 91 on the welding head. Mesh 6 is welded in the welder 57 and is pulled by a mesh carrier 61 that has one or more mesh grippers 62.

Figure 8:
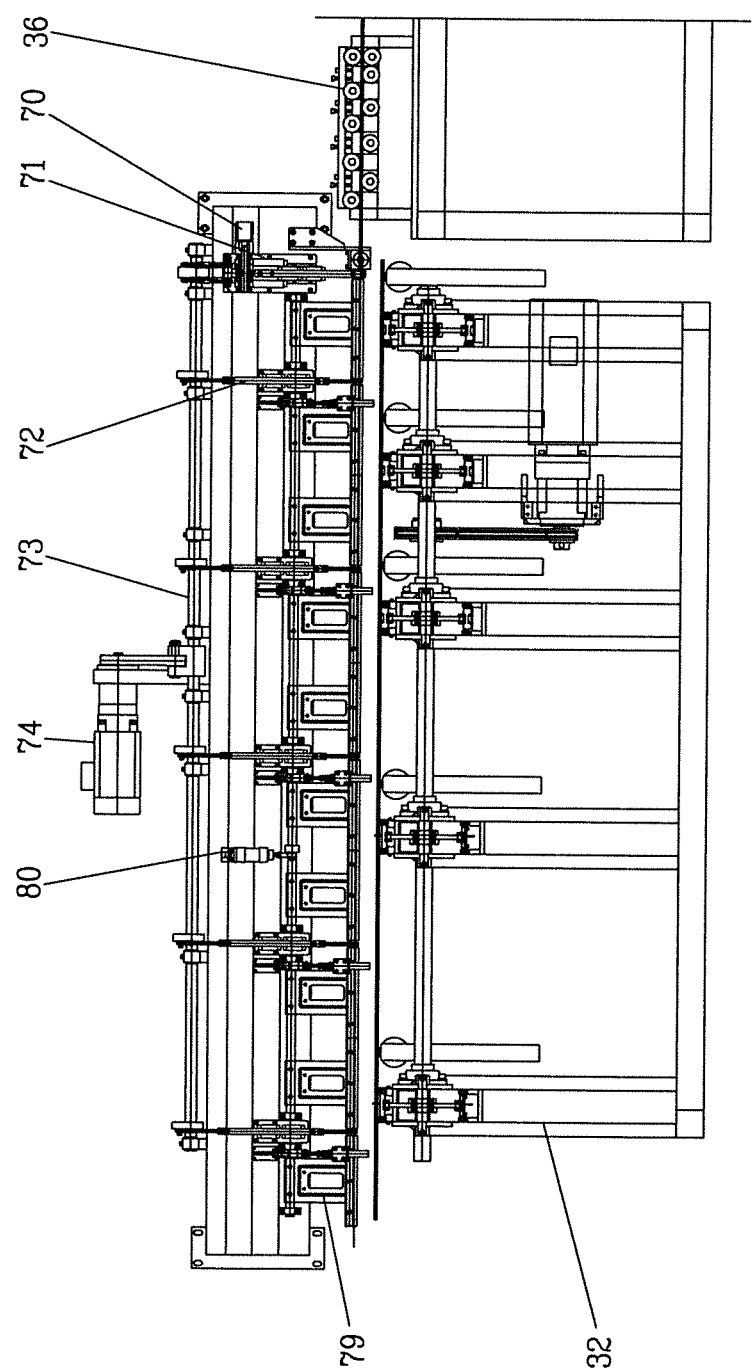
FIG. 8—side view of details of an exemplary version of wire collector, rotator unit, and associated structures and elements, depicted with the longitudinals carrier and wire straightener.

In this context, FIG. 8 may now be introduced for further explanation of some exemplary versions within the scope of the present disclosure. FIG. 8 depicts a partial side view including some details of an exemplary version of wire collector, rotator unit, and associated structures and elements, depicted with the longitudinals carrier and wire straightener. The roller straightener 36 previously discussed in reference to FIG. 5 is again depicted for orientation. Versions according to FIG. 8 may include a rotator unit 71 and a plurality of wire holders 72 all commonly driven to carry in guided manner the longitudinal wire 2 on the travel path towards the longitudinals storage 32. A common motor 74 and eccentric drive system 73 acting through a rotary shaft and linkages may controllably raise or lower the rotator unit 71 and a plurality of wire holders 72 all in unison. The wire collector 79 as depicted may be segmented along its length to allow the plural wire holders 72 to access a produced longitudinal wire within the wire collector 79. The wire collector has a motor 80 operatively connected to it to controllably open the wire collector 79 for lateral removal of a produced longitudinal wire. In versions according to FIG. 8, there may also be means for pressing longitudinal wire out of the wire holders 72 and onto a proximate longitudinals receptacle of the longitudinals storage 32, at the handover position, as shall be explained in following.

While FIG. 8 conveys an overall view of the exemplary arrangement, details of the exemplary wire collector 79, its motor 80, as well as subcomponents and their operation may be better understood with reference to FIGS. 9A-9E. As depicted in FIGS. 9A-9B, the wire collector 79 may include a plurality of segments along its length, with each segment having a movable plate segment 81 and a stationary plate segment 82. The interaction of this exemplary arrangement is understandable from FIG. 9C where the movable plate 81 is depicted as displaced away from stationary plate 82 via the action of wire collector motor 80. In this depicted position, a longitudinal wire 2 is removable from the entire wire collector 79 including all collector segments with respective movable plate segments 81, over the longitudinal extent of the wire. FIG. 9D illustrates a version of a possible mechanical linkage 83 that may effect displacement of the movable plates 81 upon energization of wire collector motor 80. When the wire collector motor 80 is not activated, as depicted in FIGS. 9D-9E, the wire collector 79 remains closed. Upon motor 80 activation, the wire collector 79 is controllably opened, the longitudinal wire is laterally removed and carried towards the longitudinals storage 32 and in traversal of the spacing between the wire collector 79 and the longitudinals storage 32.

Figure 10:
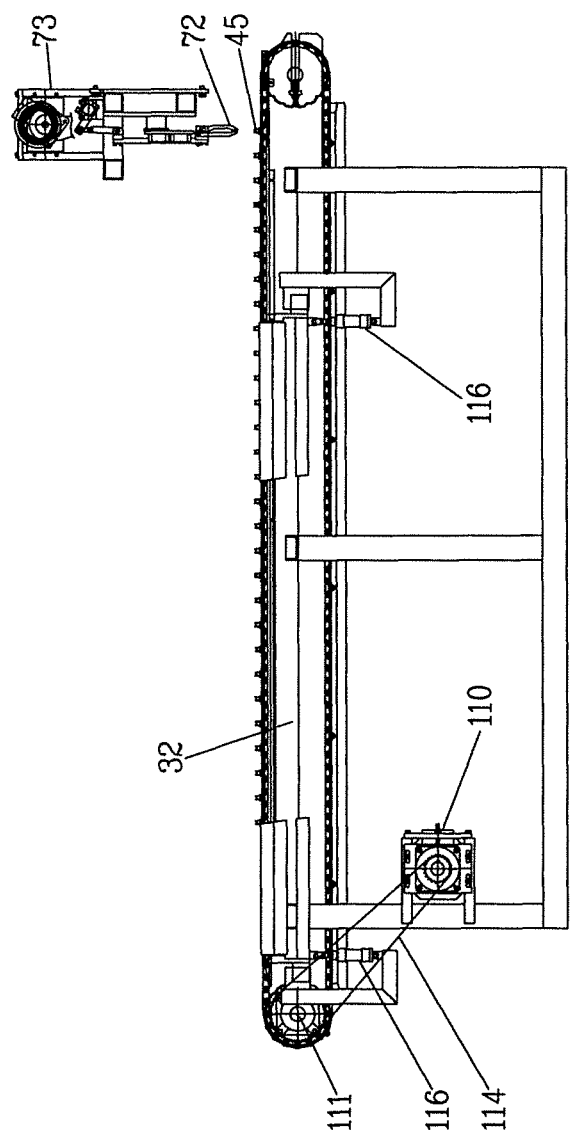
FIG. 10—depicts one isolated wire holder in relation to the longitudinals storage and a proximate longitudinals receptacle.
Figure 11A:
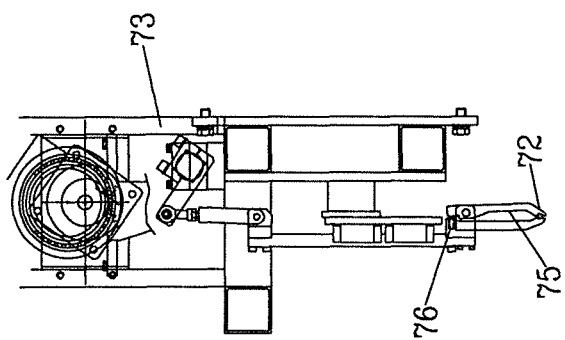
FIG. 11A—magnifies the view of FIG. 10 as to the wire holder.

Further to an understanding of FIG. 8, FIG. 10 isolates a single wire holder 72 in relation to the longitudinals storage 32, for orientation. As may be understood from this view, the eccentric drive system 73 controllably raises and lowers the holder 72 at least between, (a) a first position aligned with the wire collector 79 in spaced relation to the longitudinals storage 32, and (b) a handover position situated for delivery of wire towards a proximate longitudinals receptacle 45 on the longitudinals storage 32. This is better understood by considering magnified FIG. 11A where it may be understood that in this exemplary version, the means for holding wire released by the wire collector is a pincer 72 that has a wire passage 75 therethrough that accommodates reloading of the wire collector 79 simultaneously as the produced longitudinal wire 2 is, per FIG. 3B, in controlled translatory motion on the travel path towards the longitudinals storage. In this version as depicted, pincer 72 is spring-biased 76 to close on a longitudinal wire but not so tightly as to prevent the wire from being controllably rotated by the rotator unit 71 simultaneously, while the produced longitudinal wire 2 is, per FIG. 3B, in controlled translatory motion on the travel path towards the longitudinals storage. This pincer 72 stands as exemplary, and readers of ordinary skill in the technologies will recognize that known alternatives, such as motor-activated pincers, or laterally mounted elements lacking a wire passage 75 might possibly also be substituted as long as they carry the longitudinal wire, guiding the wire on the travel path towards the longitudinals storage and in traversal of the spacing between the wire collector 79 and the longitudinals storage 32. Reciprocation or translation might possibly be effected by other known drives as well.

Figure 11D:
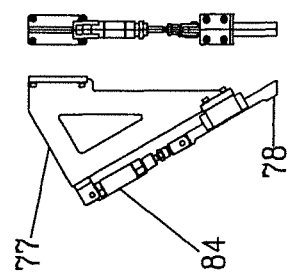
FIGS. 11B-11D—depict means for pressing wire out of wire holders.
Figure 11C:
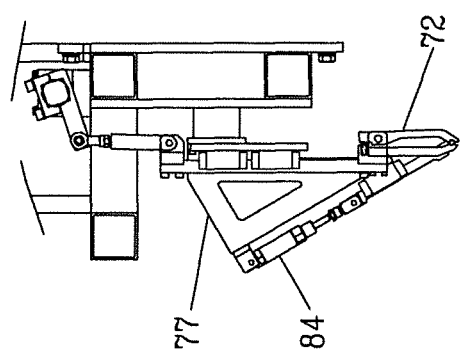
Figure 11B:
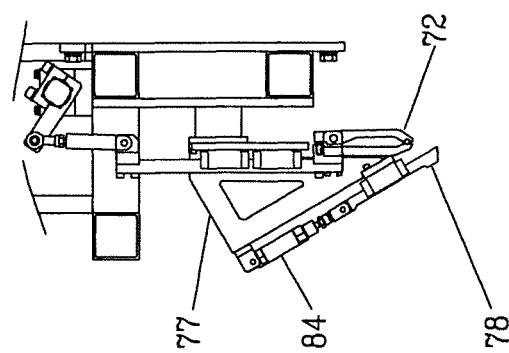

Further understanding is imparted by FIGS. 11B-11C, where an exemplary means for pressing wire out of the pincers 72 are depicted. It includes press shoes 78 that are controllably driven by respective fluid power cylinders 84, all mounted on frames 77. At the handover position, the press shoes are activated by energizing their cylinders 84, and they extract wire from pincers 72 to a proximate longitudinals receptacle 45. The rotator unit 71 then also releases the gripped longitudinal wire to complete the handover to the proximate longitudinals receptacle 45 that now restrains the longitudinal wire against freedom of rotation. Considering the view imparted by FIG. 11D, these elements may now be oriented for understanding within the context of previous FIG. 8 where they remain unlabeled because of drawing size crowding and space limitation. A frame 77 with its mounted fluid cylinder 84 and press shoe 78 forms one exemplary suitable type of extractor unit that may be employed in this context; other equivalents, such as other types of motors or frames, are also enabled by the present disclosure. The need for this type of active extraction might possibly be reduced or eliminated in cases where, unlike the present example, the pincer 72 or equivalent holder is not spring-biased 76 to close upon a longitudinal wire, but instead actively releases it. Accordingly, readers of ordinary skill in the relevant technologies will understand these as possibly advantageous options rather than necessarily mandatory requirements.

Figure 12:
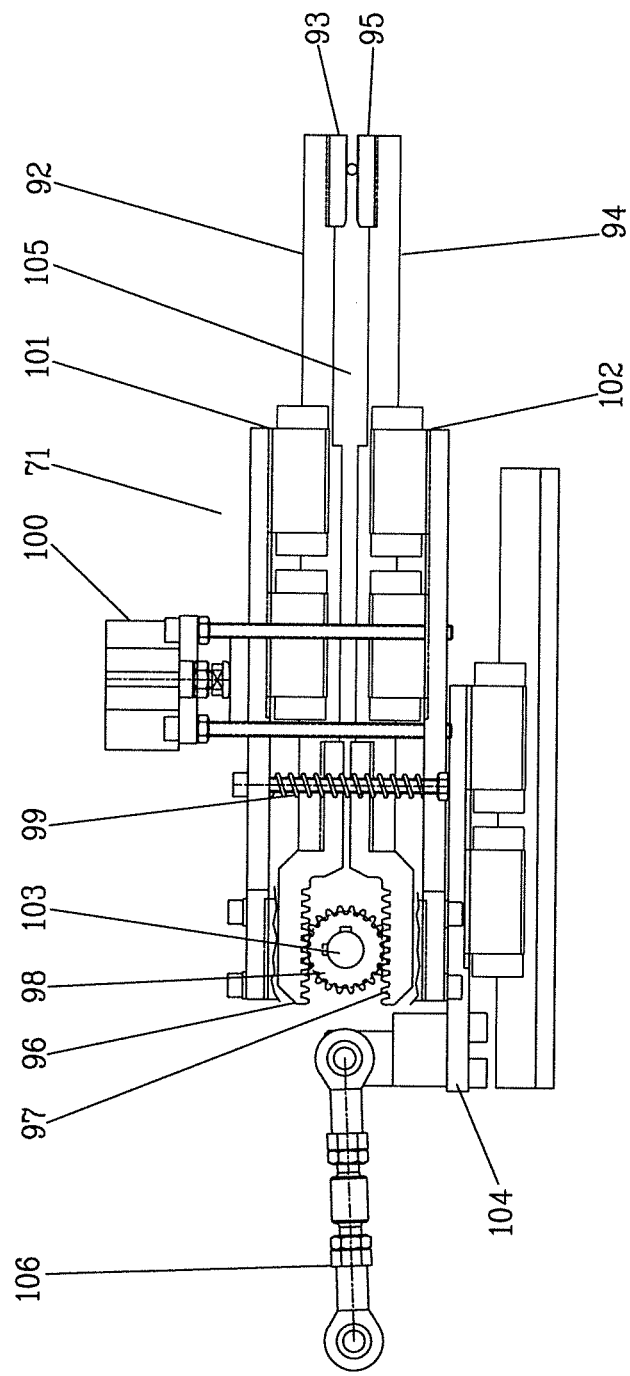
FIG. 12—depicts a rotator unit in side view.
Figure 13:
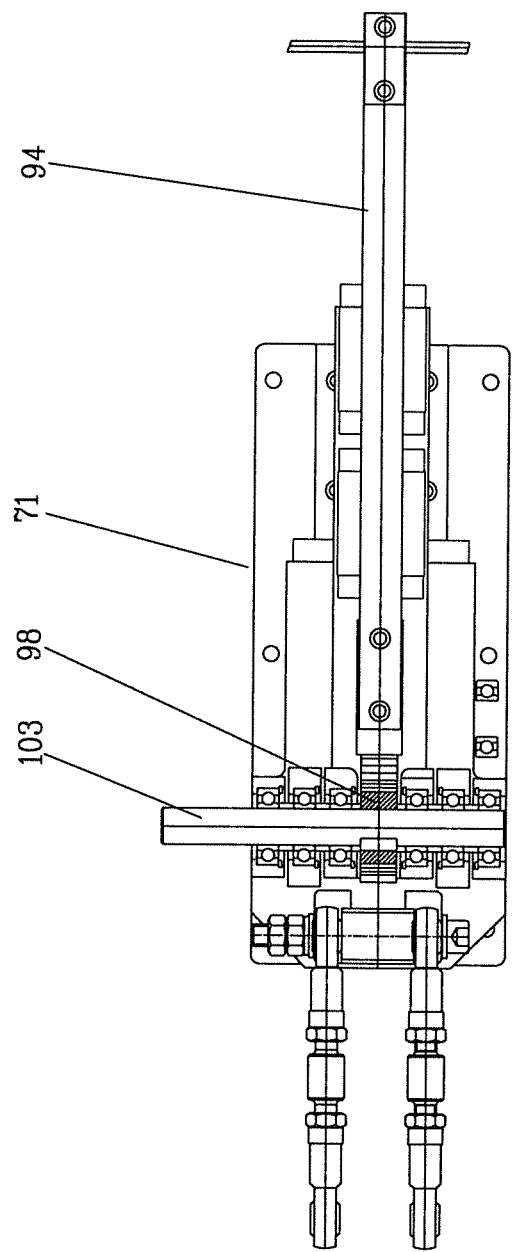
FIG. 13—depicts a rotator unit of FIG. 12 rotated 90 degrees with gear box in partial section.
Figure 14C:
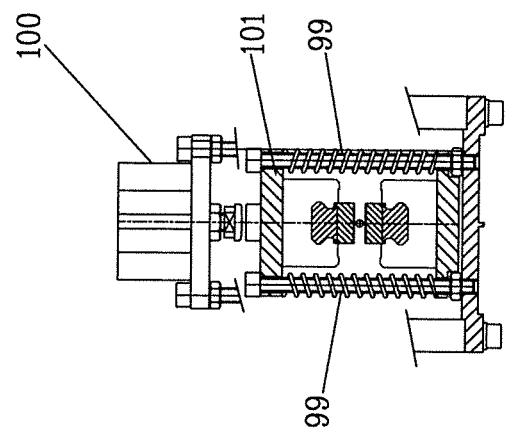
FIG. 14C—depicts the rotator unit in section near the springs.
Figure 14B:
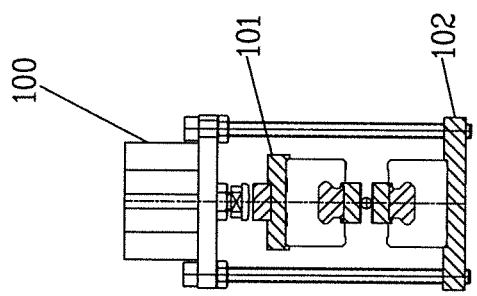
FIG. 14B—depicts the rotator unit in section near the grip motor.
Figure 14A:
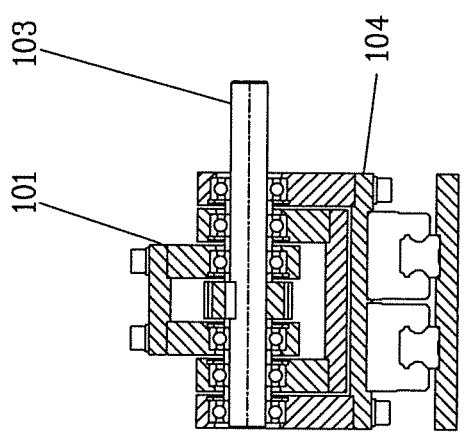
FIG. 14A—depicts the rotator unit in section at the gearbox.

Considering FIGS. 12-14, they depict an interrelated, particular wire rotator unit 71 including a first gripper arm 92, and a first gripper surface 93 being disposed on this first gripper arm 92. There is also a second gripper arm 94 opposite to and spaced from the first gripper arm 92, and a second gripper surface 95 being disposed on the second gripper arm 94. A first gripper arm drive rack 96 is connected to the first gripper arm 92, and a second gripper arm drive rack 97 is connected to the second gripper arm 94. A pinion gear 98 is disposed between the first and second gripper arm drive racks 96, 97 and engaging for simultaneous opposite reciprocations both of these first and second gripper arm drive racks 96, 97 to reciprocate the first gripper arm 92 and the first gripper surface 93 in opposite direction relative to reciprocation of the second gripper arm 94 and the second gripper surface 95. At least one spring 99 is situated to bias the first gripper arm 92 and the first gripper surface 93 away from the second gripper arm 94 and the second gripper surface 95. A grip motor 100 is operatively connected to controllably push the first gripper arm 92 towards the second gripper arm 94, in opposition to the least one spring 99.

As depicted, there may be a first carriage 101 for the first gripper arm 92, with the first gripper arm 92 being mounted to reciprocate on this first carriage 101. Also a second carriage 102 for the second gripper arm 94, with the second gripper arm 94 being mounted to reciprocate on the second carriage 102. In this case, first carriage 101 is pivotable around a drive shaft 103 of the pinion gear 98, relative to the second carriage 102. Furthermore, bearings may be installed to facilitate this reciprocation.

The grip motor 100 may be operatively connected to pivot the first carriage 101 and the first gripper arm 92 towards the second carriage 102 and the second gripper arm 94, around the drive shaft 103 of the pinion gear 98, in opposition to the at least one spring 99.

Furthermore, there may be a reciprocating elevator carriage 104, this elevator carriage 104 being operatively connected to simultaneously carry in reciprocation the drive shaft 103 of the pinion gear 98, the first carriage 101, and the second carriage 102. With reference back to FIG. 8, reciprocation is effected by a linkage 106 operatively connected to eccentric drive system 73. Here again, bearings may be installed to facilitate this reciprocation.

There may advantageously be a wire passage 105 configured to pass wire between the first gripper arm 92 and the second gripper arm 94, this wire passage being at a location between the pinion gear 98 and respective inner ends of both of the respective first and second gripper surfaces 93, 95.

Thus, this rotator unit 71 is exemplary of rotator units that may advantageously permit refilling, through wire passage 105, the wire collector 19 simultaneously, while the produced longitudinal wire 2 is, per FIG. 3B, in controlled translatory motion on the travel path towards the longitudinals storage 12. It also advantageously may controllably rotate the gripped longitudinal wire 2 around its respective longitudinal axis to a specified angle with its gripper surfaces 93, 95 simultaneously to the carrying of the longitudinal wire 2 on the travel path towards the longitudinals storage 32 in traversal of the spacing between the wire collector 79 and the longitudinals storage 32. That is, while the produced longitudinal wire 2 is, per FIG. 3B, in controlled translatory motion on the travel path towards the longitudinals storage 32. It may be understood, then, that particular rotator units 71 may afford significant saving of time and thus an increase in speed.

Figure 15:
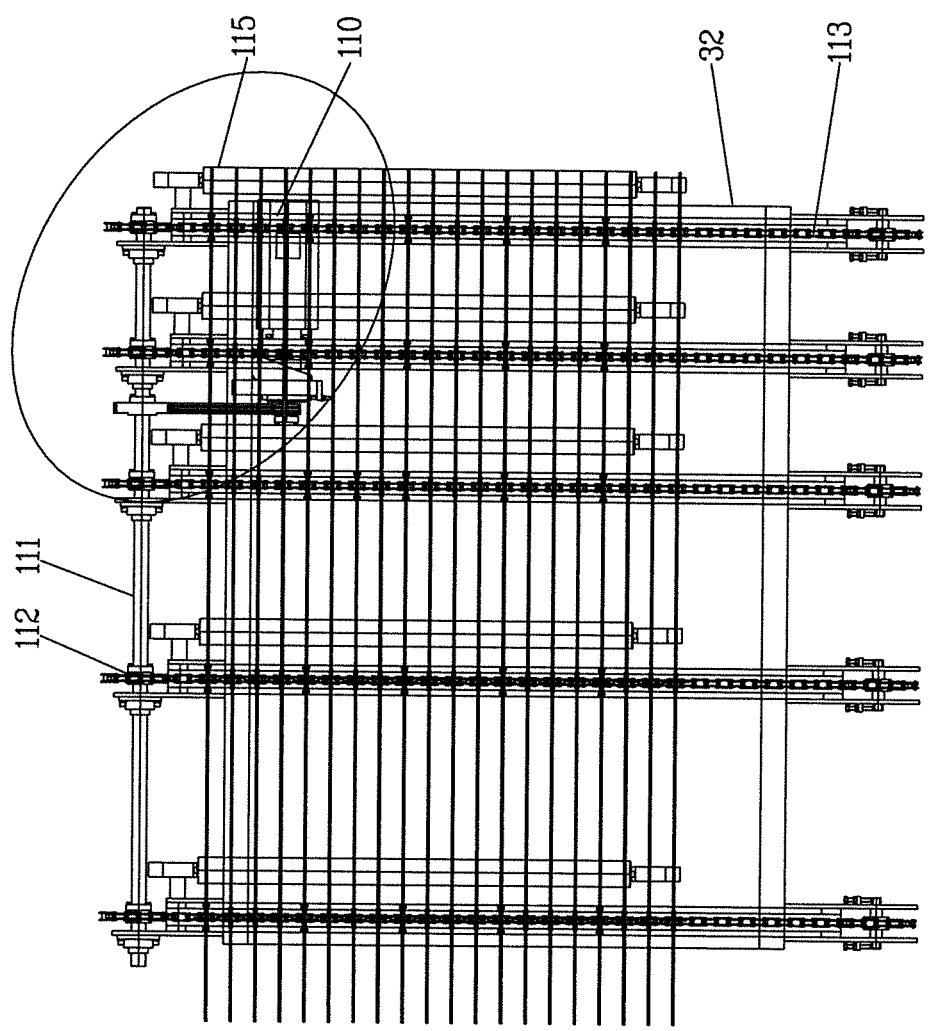
FIG. 15—depicts a version of the longitudinals carrier.
Figure 16:
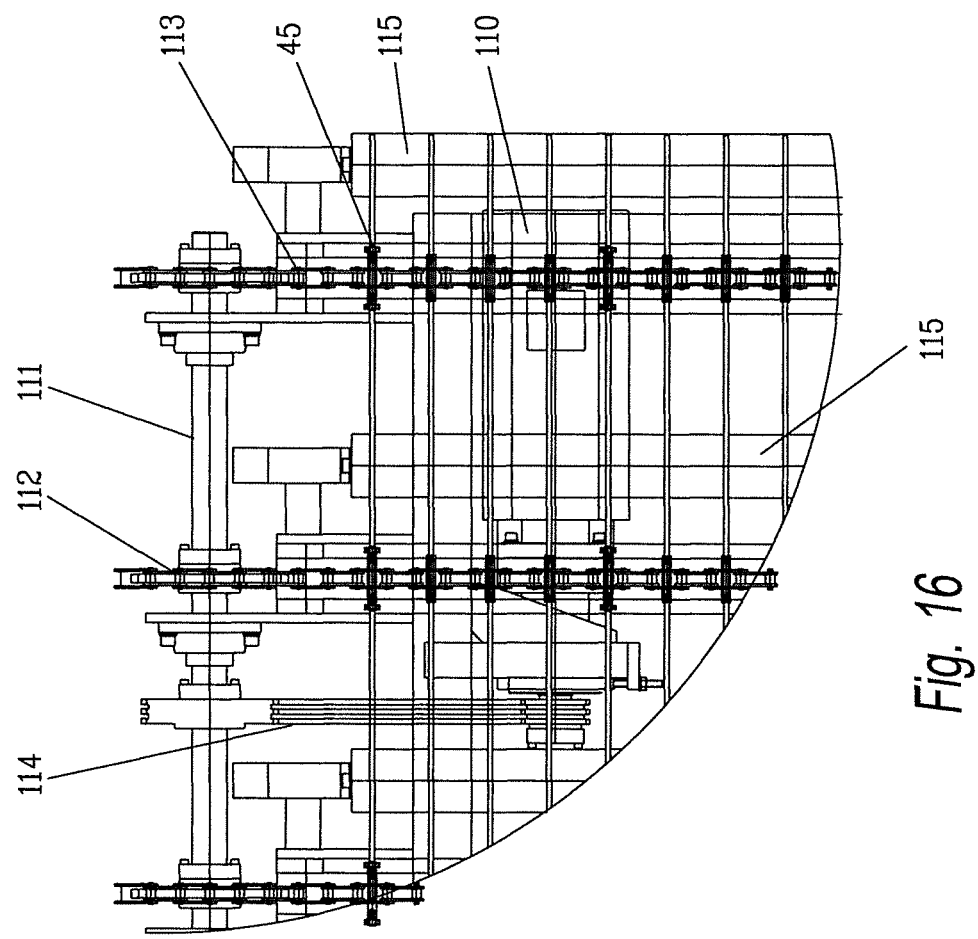
FIG. 16—is a magnified view of the circled portion of FIG. 15.

It may be beneficial to direct additional attention to some additional characteristics of the exemplary longitudinals storage depicted in FIGS. 15-16, with referral back to FIG. 10 as well, even though the scope of the present invention is not limited just to this exemplary form of longitudinals storage 32. In the variant presented by these figures, a motor 110 controllably drives a sprocket drive shaft 111 in rotation via a flexible belt 114 drive. The sprocket drive shaft has plural sprockets 112, each of which drives a respective chain 113. These chains 113 bear, and controllably position, the longitudinals receptacles 45, and thus transport the longitudinal wires 2 from the handover to positions where they may be restrained by the longitudinals carrier 31 and then removed from the longitudinals storage 32 to be advanced towards the welding unit 57 under continued restraint against freedom of rotation about their respective axes. To facilitate removal from the longitudinals storage 32 and the restraining longitudinal receptacles 45, once the longitudinals carrier 31 grips the longitudinal wires with its own grippers 34, the wires may advantageously be provided with an elevational assist from one or more elevator rollers 115 that are controllably raised by their motors 116 to rise from under the level of the chains 113 upwards to contact the restrained longitudinal wires residing in the longitudinals receptacles 45, thereby pushing them off, or out-of, the longitudinals receptacles 45. The longitudinals carrier 31 is then free to travel towards the welding unit 57 towing the longitudinal wires without the restraining forces of the longitudinals receptacles 45. Not only are the restraining forces of the longitudinals receptacles 45 removed, but also these elevator rollers 115 provide a smooth low-friction surface from which the longitudinal wires encounter negligible friction. It should be immediately understandable that these same elevator rollers 115 may possibly be cylinders mounted as freely rotatable about their respective axes so as to minimize friction on the longitudinal wires pulled over their surfaces by the longitudinals carrier 31.

Figure 17:
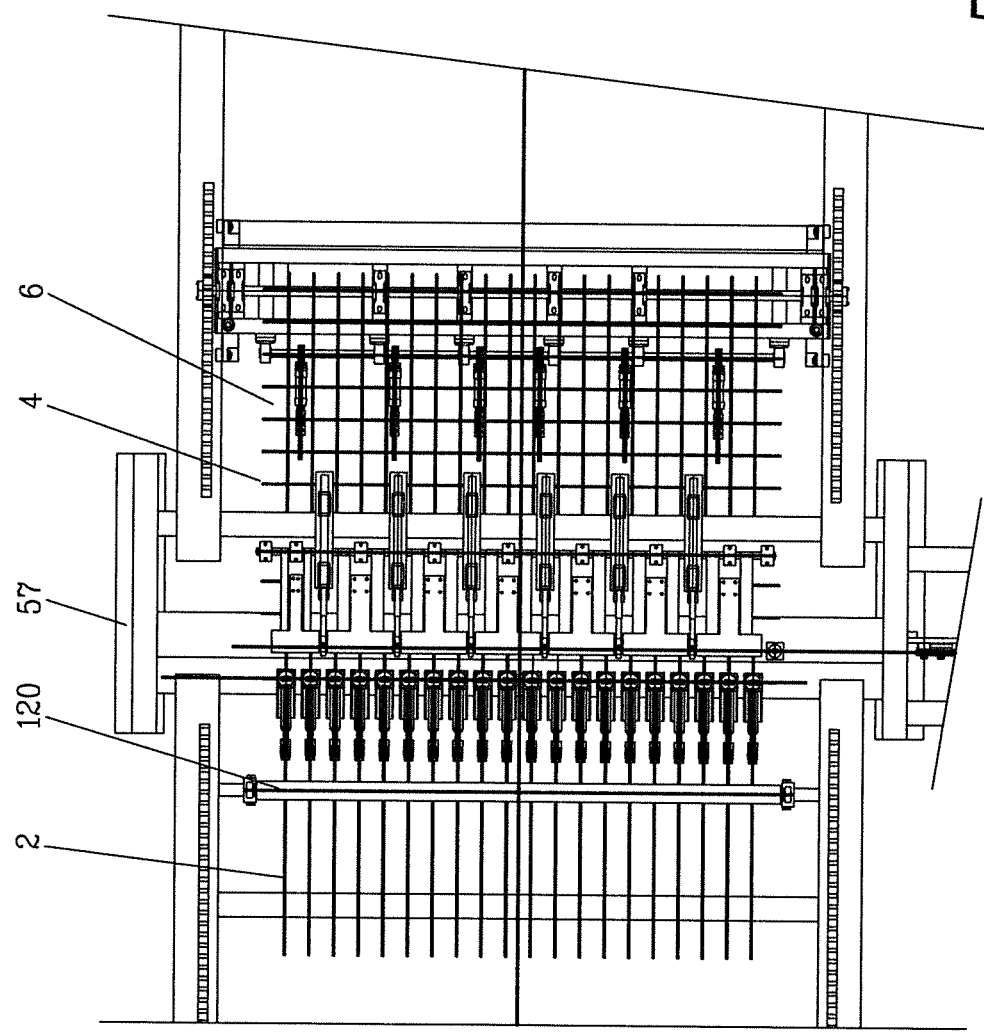
FIG. 17—depicts a top view of a variant having an advancement roller assembly situated proximate to an entry of the welding unit; and, FIG. 18—depicts a side view of a variant having an advancement roller assembly situated proximate to an entry of the welding unit.
Figure 18:
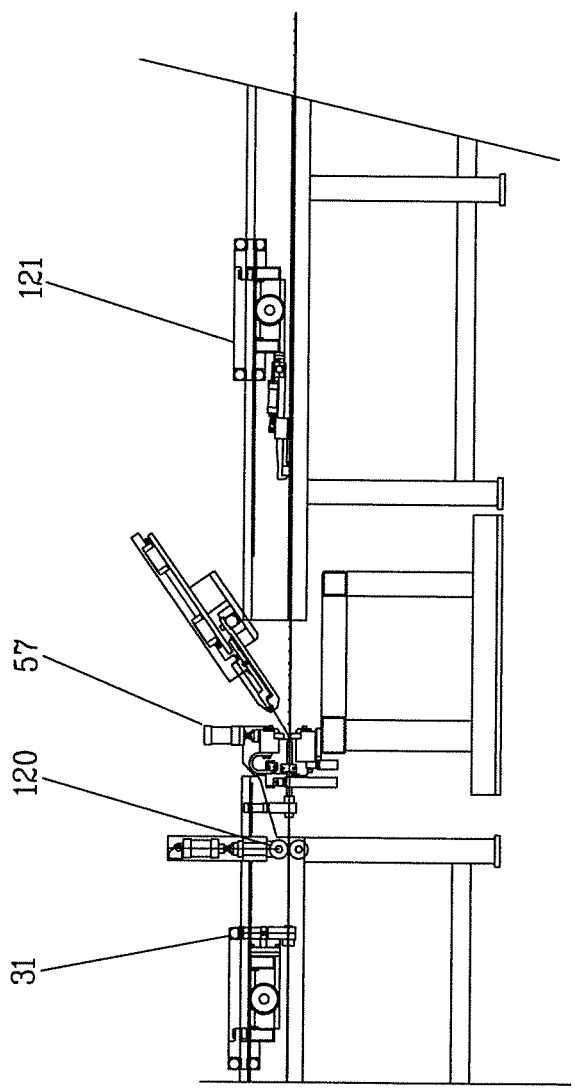

FIGS. 17-18 relate to variants where an advancement roller assembly 120 is situated proximate to an entry of the welding unit 57. The advancement roller assembly 120 is controllably engageable to take over the advancement of longitudinal wires through the welding unit, preferably after the longitudinal wires have been welded with at least the first transverse wire 4 of the mesh. This frees the longitudinals carrier 31 to return towards the longitudinals storage 32. It also permits a simplification of the mesh carrier 61, as the modified mesh carrier 121 may be one suitable for a stacking transfer of the mesh 6. The modified mesh carrier 121 does not undertake the task of generally pulling the mesh from the welder 57, and may for example rest idle while mesh 6 is produced using the longitudinal wires 2 pushed through the welding unit 57 by the advancement roller assembly 120. Towards the very end of welding of a mesh, the modified mesh carrier 121 may come into operation to finally pull the completed product or the almost-completed product mesh, so that the longitudinal wires' ends are extracted from the welding unit 57, having now lost contact with the advancement roller assembly 120. This modified mesh carrier 121 may directly take the place of, and eliminate the need for, an additional stacking carrier, because this modified mesh carrier 121 is not immediately required to return for attending to pulling through the welding unit 57 the next, sequentially produced mesh 4, given that the advancement roller assembly 120 shall push the longitudinal wires through the welding unit 57 during the majority of time required for the mesh production. Accordingly, by this variant there is gained efficiency in savings at the interval of time during which a first carrier 31 of longitudinal wires 2 to the welder 57 is required to remain in the proximity of the welder 57 while welding of transverse wires 4 occurs, rather than returning to a position ready for receipt of a new set. of longitudinal wires 2 from the longitudinals storage 32, for the next mesh 6. Furthermore, by this variant, it may be possible to effect reduction in the amount of production floor space occupied by mesh welding machines and processes of mesh welding, by possibly eliminating, replacing, or shortening certain components and/or paths of the machines and processes.

Generally regarding the scope of protection of the appended claims, it should be understood in the context of the preceding discussion that the present invention is not limited in any manner to the described and drawings-depicted implementations, but may be realized in many forms and dimensions without abandoning the region of protection of the invention. For example, in implementations of the invention the materials that are employed and also as well the dimensions of particular elements may be according to the demands of a particular construction. Thus, in closing, it should be noted that the invention is not merely limited to the abovementioned versions and exemplary working examples. Further developments, modifications and combinations are also within the scope of the patent claims and are placed in the possession of persons skilled in the technologies, from the above disclosure. Accordingly, the machines, components, systems, and processes described and illustrated herein should be understood to be illustrative and exemplary, and not necessarily limiting upon the scope of the present invention. Furthermore, in every claim, wherein recitation is followed by reference numbers or labels, these are included solely to increase the understandability of the claims, and in this manner the reference numerals do not affect the consideration of the recited elements and characteristics, which are exemplarily recognizable with them. The scope of the present invention is defined by the appended claims, including known equivalents and unforeseeable equivalents at the time of filing of this patent application.

REFERENCE LABELS LIST

2—longitudinal wires
3—axis of transverse wire advancement
4—transverse wires
5—welding axis
6—welded mesh
11—longitudinals carrier, schematic
12—longitudinals storage, schematic
13—longitudinals receptacle, schematic
14—coil, schematic
15—advancement mechanisms, schematic
16—roller straightener, schematic
17—mesh carrier, schematic
18—cutter, schematic
19—wire collector, schematic
20—gripper assembly, schematic
21—holders, schematic
24—magnet restrainer
25—spring sheath restrainer
26—clamping digit restrainer
27—welding unit, schematic
28—welding head, schematic
31—longitudinals carrier
32—longitudinals storage
33—guides on longitudinals carrier
34—grippers of carrier
35—advancement rollers (pulling/feeding mechanism)
36—roller straightener (straightener with rollers)
37—spool
40—reel (decoiler)
41—motor
45—longitudinals receptacle
50—reel (decoiler)
51—spool
52—motor
53—advancement rollers (pulling/feeding mechanism)
54—roller straightener (straightener with rollers)
55—cutter
56—welding head
57—welding unit
61—mesh carrier
62—mesh grippers
70—motor for wire gripper assembly
71—rotator unit
72—wire holders, or pincers
73—eccentric drive system
74—motor (common motor for eccentric drive system)
75—wire passage in pincer
76—spring biasing pincer to close
77—frame
78—press shoe
79—wire collector
80—wire collector motor
81—movable side of wire collector
82—stationary side of wire collector
83—mechanical linkage between wire collector motor and movable side 81
84—fluid cylinder
91—welding head grippers
92—first gripper arm
93—first gripper surface
94—second gripper arm
95—second gripper surface
96—drive rack
97—drive rack
98—pinion gear
99—spring
100—grip motor
101—first carriage
102—second carriage
103—drive shaft
104—reciprocating elevator carriage
105—wire passage
106—linkage to eccentric drive
110—motor
111—sprocket drive shaft
112—sprocket
113—chain
114—flexible belt
115—elevator rollers
116—motors for elevator rollers
120—advancement roller assembly
121—mesh carrier
W—welding line

What is claimed is:

1. A wire mesh production system comprising:
a wire straightener (16, 36) for wire;
a cutter (18) configured to receive wire straightened by said wire straightener;
a longitudinals storage (12, 32) configured to receive longitudinal wires (2) cut by said cutter, said longitudinals storage having a plurality of longitudinals receptacles (13,45) configured to restrain longitudinal wires;
a rotator unit (20, 71) configured to controllably rotate cut longitudinal wires (2) around their longitudinal axes to specified angles, said rotator unit having a gripper assembly (20, 93, 95), said rotator unit being located at an intermediate location between a location of said cutter (18) and a location (5) of transverse wire welding;
a longitudinals carrier (11,31) configured to transfer longitudinal wires (2) from said longitudinals storage (12, 32) towards a welding unit (57), said longitudinals carrier having means (34) for restraining against rotation wires held by it;
a controllably-openable wire collector (19, 79) located in spaced relation to said longitudinals storage and said plurality of longitudinals receptacles;
a first motor (73, 74) operatively connected to controllably translate said wire gripper assembly in controlled translatory motion along a travel path that extends at least between a first position aligning said wire gripper assembly with said controllably-openable wire collector, and a handover position that locates wire gripped by said wire gripper assembly proximate to one of said plurality of longitudinals receptacles;
a wire holder assembly (21, 72) situated to guide wire during controlled translatory motion of said gripper assembly between the first position and the handover position; and,
a second motor (70) operatively connected (98, 103) to controllably drive said wire gripper assembly to axially rotate gripped longitudinal wire.

2. A wire mesh production system as claimed in claim 1, further comprising:
said wire holder assembly includes a plurality of pincers (72) configured to grasp a wire located within said controllably-openable wire collector, said plurality of pincers being movably mounted for controlled movement between at least the first and the handover positions.

3. The wire mesh production system as claimed in claim 2, wherein:
said first motor (73, 74) is operatively connected to controllably move said plurality of pincers synchronously with said wire gripper assembly from the first position towards the handover position.

4. A wire mesh production system as claimed in claim 3, further comprising:
each of said plurality of pincers and also said wire gripper assembly all respectively have respective wire passages (75, 105) therethrough accommodating reloading said controllably-openable wire collector (79).

5. The wire mesh production system as claimed in claim 2, wherein:
at least one of said plurality of pincers (72) is spring-biased (76) to close upon wire held therein.

6. A wire mesh production system as claimed in claim 2, further comprising:
an extractor unit (77) configured to controllably push wire at the handover position from said plurality of pincers (72) to a proximate one of said plurality of longitudinals receptacles.

7. A wire mesh production system as claimed in claim 6, further comprising:
said extractor unit includes a plurality of controllably driven press shoes (78) aligned to controllably push a wire from said plurality of pincers.

8. A wire mesh production system as claimed in claim 1, further comprising:
a first side plate (81) included in said controllably-openable wire collector; and,
a second side plate (82) included in said controllably-openable wire collector.

9. A wire mesh production system as claimed in claim 8, further comprising:
a first plurality of side plate segments (81) forming said first side plate;
a second plurality of side plate segments (82) forming said second side plate; and,
said wire holder assembly includes at least one pincer (72) configured to grasp wire between two respective side plate segments of said first plurality of side segments.

10. A wire mesh production system as claimed in claim 8, further comprising:
a wire-collector motor (84) operatively connected (83) to controllably impart a relative motion between said first and second side plates of said controllably-openable wire collector.

11. A wire mesh production system as claimed in claim 1, further comprising:
a wire rotator unit (71) comprising:
a first gripper arm (92), and a first gripper surface (93) being disposed on said first gripper arm;
a second gripper arm (94) opposite to and spaced from said first gripper arm, and a second gripper surface (95) being disposed on said second gripper arm;
a first gripper arm drive rack (96) connected to said first gripper arm;
a second gripper arm drive rack (97) connected to said second gripper arm;
a pinion gear (98) disposed between said first and second gripper arm drive racks and engaging for simultaneous opposite reciprocations both of said first and second gripper arm drive racks to reciprocate said first gripper arm and said first gripper surface in opposite direction relative to reciprocation of said second gripper arm and said second gripper surface;
at least one spring (99) situated to bias said first gripper arm and said first gripper surface away from said second gripper arm and said second gripper surface; and,
a grip motor (100) operatively connected to controllably push said first gripper arm towards second gripper arm, in opposition to said at least one spring.

12. A wire mesh production system as claimed in claim 11, further comprising:
a first carriage (101) for said first gripper arm (92), said first gripper arm being mounted to reciprocate on said first carriage;
a second carriage (102) for said second gripper arm (94), said second gripper arm being mounted to reciprocate on said second carriage; and,
said first carriage being pivotable, around a drive shaft (103) of said pinion gear (98), relative to said second carriage.

13. A wire mesh production system as claimed in claim 12, wherein:
said grip motor (100) is operatively connected to pivot said first carriage (101) and said first gripper arm (92) towards said second carriage (102) and said second gripper arm (94), around said drive shaft (103) of said pinion gear (98), in opposition to said at least one spring (99).

14. A wire mesh production system as claimed in claim 12, further comprising:
a reciprocating elevator carriage (104), said elevator carriage being operatively connected to simultaneously carry in reciprocation said drive shaft of said pinion gear, said first carriage, and said second carriage.

15. A wire mesh production system as claimed in claim 11, further comprising:
a wire passage (105) configured to pass wire between said first gripper arm and said second gripper arm, said wire passage being at a location between said pinion gear (98) and respective inner ends of both of said respective first and second gripper surfaces (93, 95).

16. A process for wire mesh production, comprising the steps of:
pulling wire from at least one coil (14);
straightening (16) the pulled wire;
restraining by gripping (20, 11) the wire;
cutting (18) the straightened pulled wire to produce gripped longitudinal wires (2);
controllably rotating (20) respective gripped longitudinal wires around their respective longitudinal axes to specified angles;

depositing the rotated longitudinal wires at a longitudinals storage (12) that has a plurality of longitudinals receptacles (13);

transferring the longitudinal wires from the longitudinals storage to a longitudinals carrier (11);

moving the longitudinals carrier to advance the longitudinal wires towards a welding unit (W, 57);

welding (5, W) the wires into mesh with transverse wires (4);

restraining (20, 11) the longitudinal wires at least until their welding with a first transverse wire (4) in the mesh (6);

filling a wire collector (19, 79), positioned in spaced relation to the longitudinals storage (12, 32), with wire;

gripping wire in the wire collector with a gripper assembly (20, 93, 95);

controllably opening the wire collector to remove the wire therein laterally along its length;

carrying (21, 72) the removed wire laterally to its axis on a travel path towards the longitudinals storage and in traversal of the spacing between the wire collector and the longitudinals storage; and, simultaneously, during said step of carrying the removed wire, controllably rotating with the gripper assembly the wire around its longitudinal axis to a specified angle.

17. A process for mesh wire production, as claimed in claim 16, further comprising the step of:

simultaneously refilling the wire collector (19, 79) during said step of carrying the removed wire.

18. A process for mesh wire production as claimed in claim 16, further comprising the step of:

carrying the removed wire laterally to its axis on the travel path towards the longitudinals storage by controllably moving at least one holder (21, 72) synchronously with the gripper assembly.

19. A process for wire mesh production as claimed in claim 18, further comprising the step of:

refilling the wire collector through respective wire passages (75, 105) in the gripper assembly and the at least one holder, respectively, during said step of carrying the removed wire laterally to its axis on the travel path towards the longitudinals storage by controllably moving at least one holder synchronously with the gripper assembly.

20. A process for mesh wire production as claimed in claim 18, further comprising the steps of:

mechanically extracting (77, 78) wire onto the longitudinals storage (12, 32) from the at least one holder; and, releasing the gripper assembly.

* * * * *